United States Patent
Kawaguchi

(10) Patent No.: US 9,142,187 B2
(45) Date of Patent: Sep. 22, 2015

(54) SEMICONDUCTOR DEVICE, IMAGE PROCESSING SYSTEM, AND PROGRAM

(71) Applicant: Renesas Electronics Corporation, Kawasaki-shi, Kanagawa (JP)

(72) Inventor: Hirofumi Kawaguchi, Kanagawa (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 261 days.

(21) Appl. No.: 13/861,297

(22) Filed: Apr. 11, 2013

(65) Prior Publication Data

US 2013/0286040 A1    Oct. 31, 2013

(30) Foreign Application Priority Data

Apr. 27, 2012    (JP) ................................. 2012-103065

(51) Int. Cl.
*G09G 5/06* (2006.01)
*H04N 1/60* (2006.01)

(52) U.S. Cl.
CPC ... *G09G 5/06* (2013.01); *H04N 1/60* (2013.01)

(58) Field of Classification Search
None
See application file for complete search history.

(56) References Cited

U.S. PATENT DOCUMENTS

| 7,545,533 | B2 | 6/2009 | Ok et al. |
| 2005/0219574 | A1 | 10/2005 | Ok et al. |
| 2010/0265548 | A1* | 10/2010 | Yamaguchi et al. ......... 358/3.05 |
| 2010/0277500 | A1* | 11/2010 | Otsuka et al. ................. 345/591 |

FOREIGN PATENT DOCUMENTS

| JP | 2005-160086 A | 6/2005 |
| JP | 2005-277484 A | 10/2005 |

* cited by examiner

*Primary Examiner* — Todd Buttram
(74) *Attorney, Agent, or Firm* — McGinn IP Law Group, PLLC

(57) ABSTRACT

A semiconductor device includes an adjustment data generation unit receiving at least a part of adjustment values of color attributes of each of n-axis vertices (n is an integer not less than 3), the n axes serving as an adjustment axis in a RGB color space. The adjustment data generation unit calculates the degree of influence which indicates the following index of each of the n-axis vertices based on the distance between each of the n-axis vertices and a target point which is an arbitrary lattice point in the RGB color space. The adjustment data generation unit calculates adjusted coordinates of the target point in the RGB color space based on shifting of each of the n-axis vertices in the RGB color space according to the adjustment value and the degree of influence. The image adjustment unit performs color adjustment of inputted image data.

19 Claims, 21 Drawing Sheets

FIG. 2

<HUE>

| RED | | ±0 |
| YELLOW | | ±0 |
| GREEN | | ±0 |
| CYAN | | ±0 |
| BLUE | | ±0 |
| MAGENTA | | ±0 |

<SATURATION>

| RED | | ±0 |
| YELLOW | | ±0 |
| GREEN | | ±0 |
| CYAN | | ±0 |
| BLUE | | ±0 |
| MAGENTA | | ±0 |

<LUMINANCE>

| RED | | ±0 |
| YELLOW | | ±0 |
| GREEN | | ±0 |
| CYAN | | ±0 |
| BLUE | | ±0 |
| MAGENTA | | ±0 |

SETUP

SEMICONDUCTOR DEVICE, IMAGE PROCESSING SYSTEM, AND PROGRAM

CROSS-REFERENCE TO RELATED APPLICATIONS

The disclosure of Japanese Patent Application No. 2012-103065 filed on Apr. 27, 2012 including the specification, drawings, and abstract is incorporated herein by reference in its entirety.

BACKGROUND

The present invention relates to a semiconductor device, an image processing system, and a program, and specifically relates to a semiconductor device, an image processing system, and a program which adjust at least one of luminance, hue, and saturation.

In recent years, various image processing technologies are employed for realizing a high-quality image. One of the examples of the image processing technologies is a 6-axis color control. The 6-axis color control is a technology which adjusts luminance, hue, and saturation in each of six axes of Red, Green, and Blue as the three primary colors and Yellow, Cyan, and Magenta as the neutral colors. Applications of the 6-axis color control include generally the following two: (1) color gamut mapping and (2) image quality setting.

The color gamut mapping ((1) cited above) is a technology employed in the so-called color management. Generally, even when the same object is displayed, the colors reproduced will be different between devices, such as between different monitors or between a monitor and a printer, because the color reproduction characteristic of each device is different. Therefore, it may be difficult to decide the output color of which device as the standard color. The color management is the technology to bring the color reproduced by all devices close to a desired color as the standard, so that even if an arbitrary object is seen and identified by any device, it looks like almost the same color. The technology of matching the reproduced color of a target device to a color as the standard is called color gamut mapping. Devices, such as a monitor and a printer, generate various colors by additive color mixing or subtractive color mixing. Therefore, when the reproduced color of a color (Red, Green, Blue, Yellow, Cyan, and Magenta) which becomes the source of the colors to be generated is matched between devices (between different monitors or between a monitor and a printer, etc.), all colors will match for the most part in the entire area of the reproduced colors. The present method (color matching between plural devices) can be realized only by adjusting luminance, hue, and saturation of the six axes (colors) described above. Therefore, the 6-axis color control is employed as the simplest technique of hue mapping.

The image quality setting ((2) cited above) is employed in the same way as adjustment items, such as contrast, brightness, color, tint, white balance, and a gamma characteristic, which are parameters of general image adjustments. Specifically, the 6-axis color control is employed as an auxiliary tool in the image quality setting called liking of an end user or image reproduction of picture-related equipment manufacturers.

Hereinafter, the disclosed technology regarding the 6-axis color control is explained. Patent Literature 1 discloses a color signal conversion device which adjusts the delicate color tone and color depth for a color image displayed by use of an RGB color signal. The color signal conversion device according to Patent Literature 1 calculates a chromatic color signal and an achromatic color signal from an input RGB color signal. Then, the color signal conversion device calculates a hue basic area from the calculated chromatic color signal by dividing a hue coordinate system into six. The color signal conversion device converts the chromatic color signal in each hue basic area, so as to obtain a target color, and calculates an output color signal by use of the achromatic color signal before the conversion and the chromatic color signal after the conversion.

Patent Literature 2 discloses a technology to avoid a color from being adjusted to an area outside an RGB color space in adjustment of saturation and hue by use of the color difference signals (Cb/Cr). In detail, a color adjustment device according to Patent Literature 2 calculates a boundary value of the saturation component (Cb/Cr) corresponding to each input signal level, and normalizes the entire YCbCr color space by use of the boundary value. Then, the color adjustment device concerned adjusts saturation and hue in each arbitrary color area in the normalized YCbCr color space. Accordingly, it is realized that only a desired color component is adjusted.

By the way, in implementing the 6-axis color control by use of hardware, there are mainly two realization methods by means of (1) a dedicated circuit and (2) a three-dimensional look-up table.

In execution of the 6-axis color control by means of a dedicated circuit ((1) cited above), a circuit which is specialized in the 6-axis color control compensates luminance, hue, and saturation of the six axes (colors). Therefore, the color characteristic reproduced will be restricted only to the characteristics of arithmetic processing of the dedicated circuit. Furthermore, it is difficult for the dedicated circuit to perform processing other than the 6-axis color control. That is to say, the processing which can be realized by the present dedicated circuit is restricted to the 6-axis color control. Therefore, it becomes necessary to separately provide a circuit for realizing other functions; accordingly, there arises an issue of increase of a circuit scale.

Next, the following explains the 6-axis color control by means of a three-dimensional look-up table ((2) cited above). The information of the three-dimensional look-up table is stored in an arbitrary memory. The three-dimensional look-up table holds the table data corresponding to coordinate points, such as 9×9×9 or 17×17×17, which express the RGB color space. FIG. 21 illustrates an RGB color space including coordinate points of 9×9×9. In the following explanation with reference to FIG. 21, it is defined that the minimum value of the RGB color space is 0, and the maximum value is 256. In this connection, since the range of value which an 8-bit value can take is 0-255, a coordinate point which has a value greater than 255 is adjusted so as to fit in the range of 0-255.

The three-dimensional look-up table stores correspondence of the coordinates of each point in the RGB color space and the coordinates of a conversion destination (after adjustment) of the coordinates concerned. For example, in cases where the three-dimensional look-up table has table data corresponding to the coordinate points of 17×17×17, RGB coordinates (0, 0, 0) and RGB coordinates of the conversion destination thereof, RGB coordinates (16, 16, 16) and RGB coordinates of the conversion destination thereof, etc. are stored, respectively. Generally, each point stored in the three-dimensional look-up table is arranged at equal intervals (for example, an R value (or a G value or a B value) of each point is set at 0, 16, 32, 48, . . . , 256). Then, an arbitrary processing unit refers to the three-dimensional look-up table and calculates the coordinates of a conversion destination by various kinds of interpolation processing by use of coordinates which exist in the color space. For example, the processing unit concerned calculates the conversion destination coordinates of RGB coordinates (8, 8, 8) with reference to the conversion destination coordinates of RGB coordinates (0, 0, 0) and the conversion destination coordinates of RGB coordinates (16, 16, 16). That is, the processing unit concerned calculates the conversion destination coordinates of RGB coordinates (8, 8, 8), with reference to the conversion destination coordinates of 8 points of RGB coordinates (0, 0, 0), (16, 0, 0), (0, 16, 0), (0, 0, 16), (16, 16, 0), (16, 0, 16), (0, 16, 16), and (16, 16, 16).

As described above, the three-dimensional look-up table only holds table data and does not have any function. However, depending on a setup of the table data, it is possible to realize various color management functions, such as a 6-axis color control, a memory color correction, and a gamma correction. It is possible to realize these functions by changing the table data (data of the conversion original coordinates and data of the conversion destination coordinates) in the three-dimensional look-up table. Furthermore, it also becomes possible to realize various color management functions concurrently, by the setup of the table data in the three-dimensional look-up table. For example, it is possible to store the conversion destination coordinates in the three-dimensional look-up table, in the case of performing the 6-axis color control after performing memory color correction to a color indicated by the coordinates of each point. Furthermore, the picture signal processing performed by referring to the three-dimensional look-up table can be realized by hardware; accordingly it is possible to realize high-speed processing.

In this way, the image processing using a three-dimensional look-up table has an absolutely high degree of freedom compared with the case where a dedicated circuit is provided. In detail, the image processing using a three-dimensional look-up table can realize plural functions easily, and at the same time, can secure a processing speed and processing accuracy sufficiently. Therefore, it is possible to provide many cost advantages such as reduction of development resources and downsizing of a circuit scale, and to realize improvement in usability. Moreover, only by replacing table data, it is possible to improve efficiency and to correct a defective condition.

The technology disclosed by Patent Literature 1 and Patent Literature 2 is not the technology which employs a three-dimensional look-up table. Therefore, if the device is materialized by hardware, there arises an issue of increase of a circuit scale. On the other hand, when the device is realized by software, there arises an issue of a long processing time. In particular, when processing an image with large data size, such as a Hi-Vision image (1920×1080), the issue of the processing time becomes serious.

(Patent Literature)
(Patent Literature 1) Japanese Unexamined Patent Publication No. 2005-277484
(Patent Literature 2) Japanese Unexamined Patent Publication No. 2005-160086

SUMMARY

When performing the 6-axis color control using the three-dimensional look-up table described above, it is necessary to perform a setup which specifies into which color a user converts each color (color at each of lattice points, for example, 9×9×9). Therefore, if a user sets up the table data of the three-dimensional look-up table, without having a high degree of know-how about the 6-axis color control, an output image will have color distortion (phenomenon in which the continuity in an RGB color space is not compensated but impaired). Accordingly, when an image which has gradation with gently-changing luminance for example is inputted, there arises an issue of performance degradation, such as appearance of an outline which should not exist originally, impaired gradation characteristics, and others. Furthermore, if a user sets up the table data of the three-dimensional look-up table, without having a high degree of know-how about the 6-axis color control, there is a possibility that there arises an issue that colors other than the adjustment-target color will also change (for example, even when one wishes to adjust only Red, the color of Yellow and Magenta which are the adjoining axis (color) will change, or a color will be set to an achromatic color which originally does not have a color).

Moreover, even if the user has a high degree of know-how about the 6-axis color control, the user has to set up the table data (conversion original coordinates and conversion destination coordinates) of large numbers corresponding to the size of the three-dimensional look-up table (for example, 729 pieces in the case of 9×9×9 and 4913 pieces in the case of 17×17×17).

Also in the color signal conversion device disclosed by Patent Literature 1, which does not employ a three-dimensional look-up table, it is assumed that a user inputs a color adjustment signal. However, even in this case, there is no difference in requiring a high degree of know-how about the 6-axis color control. That is to say, irrespective of using or not using the three-dimensional look-up table, in order to execute the 6-axis color control, the user is required to have a high degree of know-how about the 6-axis color control; accordingly, there is a possibility of occurrence of the issues (color distortion etc.) described above.

The above-described explanation has been made about the 6-axis color control, the issue described above is not restricted to the 6-axis color control, but a similar issue occurs also in an n-axis color control (n is an integer equal to or greater than three).

That is, with the technology described above, there arises an issue that, in order to realize the n-axis color control (n is an integer equal to or greater than three), the user is required to have a high degree of know-how and the setup is painful. That is to say, there is an issue that it is difficult to realize the n-axis color control without requiring a user's burden.

The other issues and new features of the present invention will become clear from the description of the present specification and the accompanying drawings.

According to one embodiment of the present invention, an image processing system calculates the degree of influence from the distance between a target point which is an arbitrary lattice point in an RGB color space, and each of the n-axis vertices. Then, the image processing system automatically calculates the RGB coordinates of the target point after adjustment, based on shifting of each of the n-axis vertices and the degree of influence.

In the present invention, it is possible to provide a semiconductor device, an image processing system, and a program which can realize the n-axis color control, without requiring a user's burden.

BRIEF DESCRIPTION OF THE DRAWINGS

FIG. 2 is a drawing illustrating an example of an input interface provided by an input interface unit 200 according to Embodiment 1;

DETAILED DESCRIPTION

Embodiment 1

Figure 1:
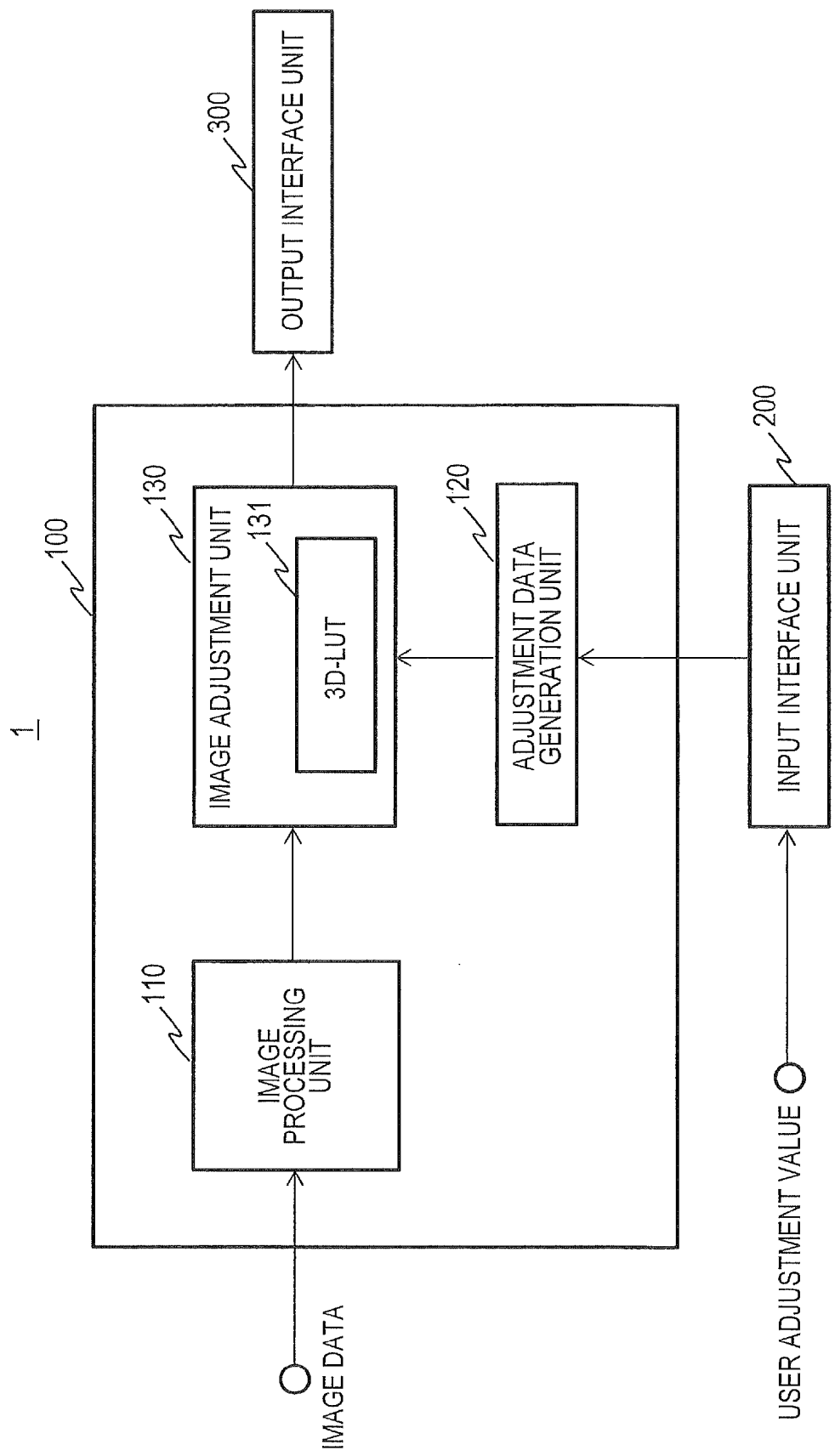
FIG. 1 is a block diagram illustrating a configuration of an image processing system according to Embodiment 1.

Hereinafter, an embodiment of the present invention is explained with reference to drawings. FIG. 1 is a block diagram illustrating a configuration of an image processing system including an image processing device according to the present embodiment. The image processing system 1 is configured with the image processing device 100, an input interface unit 200, and an output interface unit 300. The image processing system 1 is realized by the combination of each circuit in an ordinary computer apparatus and software which is executed by a CPU (Central Processing Unit) in the computer apparatus concerned, for example.

The input interface unit 200 provides an input interface for inputting an adjustment value of a 6-axis color control, and acquires the adjustment value of the 6-axis color control via the input interface concerned. When described in detail, the input interface unit 200 receives an adjustment value of luminance, hue, and saturation of each of 6-axis vertex colors (Red, Green, Blue, Yellow, Cyan, and Magenta) of the 6-axis color control.

FIG. 2 illustrates an example of the input interface provided by the input interface unit 200. As illustrated in the figure, the input interface unit 200 provides an input screen of GUI (Graphical User Interface) which is displayed on an arbitrary display device and can be operated with an input device such as a mouse. A user operates the input device on the input screen concerned, and inputs the adjustment value of a color attribute (luminance, hue, saturation) about each of the 6-axis vertex colors. The adjustment value about each of the 6-axis vertex colors will be described later with reference to FIGS. 4-9.

In addition, the input interface unit 200 not only acquires the adjustment value of the color attribute of each color from a setting screen of GUI, but it may provide an input screen of CUI (Character User Interface) and may acquire the adjustment value of the color attribute (luminance, hue, saturation) of each of the 6-axis vertex colors from a file inputted via the CUI concerned.

The image processing device 100 calculates a color by adjusting each color in an RGB color space based on the adjustment value supplied by the input interface unit 200, and performs the 6-axis color control to RGB image data acquired from an arbitrary memory unit and other devices, using the calculated color concerned. Here, the RGB image data are data of an arbitrary size in which each pixel is expressed in terms of RGB values. Hereinafter, the detailed configuration of the image processing device 100 is explained.

The image processing device 100 is configured with an image processing unit 110, an adjustment data generation unit 120, and an image adjustment unit 130.

The image processing unit 110 reads image data from an arbitrary memory unit. The image processing unit 110 performs scaling of the image data read if necessary, and supplies the image data after scaling to the image adjustment unit 130. It is also preferable that the image processing unit 110 may receive image data from other devices through a communication unit (not shown). Moreover, not only the image processing unit 110 treats some image data (GIF etc.) as a processing target, but it is also preferable that the image processing unit 110 may treat an image corresponding to a display screen which is displayed on a display device coupled to the ordinary personal computer etc., as the above-described image data.

The image adjustment unit 130 is provided with a three-dimensional look-up table 131. The three-dimensional look-up table 131 is a general three-dimensional look-up table defined in the RGB color space, having lattice points of 9×9×9 or 17×17×17 with 8-bit or 10-bit accuracies. The three-dimensional look-up table (3D-LUT) 131 stores data (called hereinafter table data) in which the coordinates of each lattice point in the RGB color space (each lattice point illustrated in FIG. 21) and the adjusted coordinates of each lattice point concerned are associated. For example, the three-dimensional look-up table 131 stores the table data as many as the number of the lattice points (9×9×9=729 pieces, 17×17×17=4913 pieces), each table data indicating the correspondence relation such that the lattice point coordinates (R1, G1, B1) in the RGB color space are moved to (R2, G2, B2). Each table data stored in the three-dimensional look-up table 131 is set up by the adjustment data generation unit 120.

The image adjustment unit 130 performs the color adjustment of the image data inputted from the image processing unit 110 with reference to the three-dimensional look-up table 131, and supplies the image data after the adjustment to the output interface 300. In this connection, when the image adjustment unit 130 adjusts a color which is not included at each lattice point in the RGB color space (a color between lattice points), it is preferable to calculate the color to be converted using an optional interpolation method (a method of linear interpolation, a method of cubic interpolation, etc.). It is also preferable that after the adjustment of the color, the image adjustment unit 130 may perform various kinds of adjustment processing matched to a monitor, etc. on which the color is displayed.

The adjustment data generation unit 120 calculates the table data to be set to the three-dimensional look-up table 131 (for example, the table data of 729 pieces, or the table data of 4913 pieces), on the basis of the adjustment value of the luminance, hue, and saturation about each of the 6-axis vertex colors supplied from the input interface unit 200. Assuming that each value of RGB is 8 bits, the volume of the output data of the adjustment data generation unit 120 amounts to 17479 bits (729 pieces (9×9×9)×8 bits).

Figure 3:
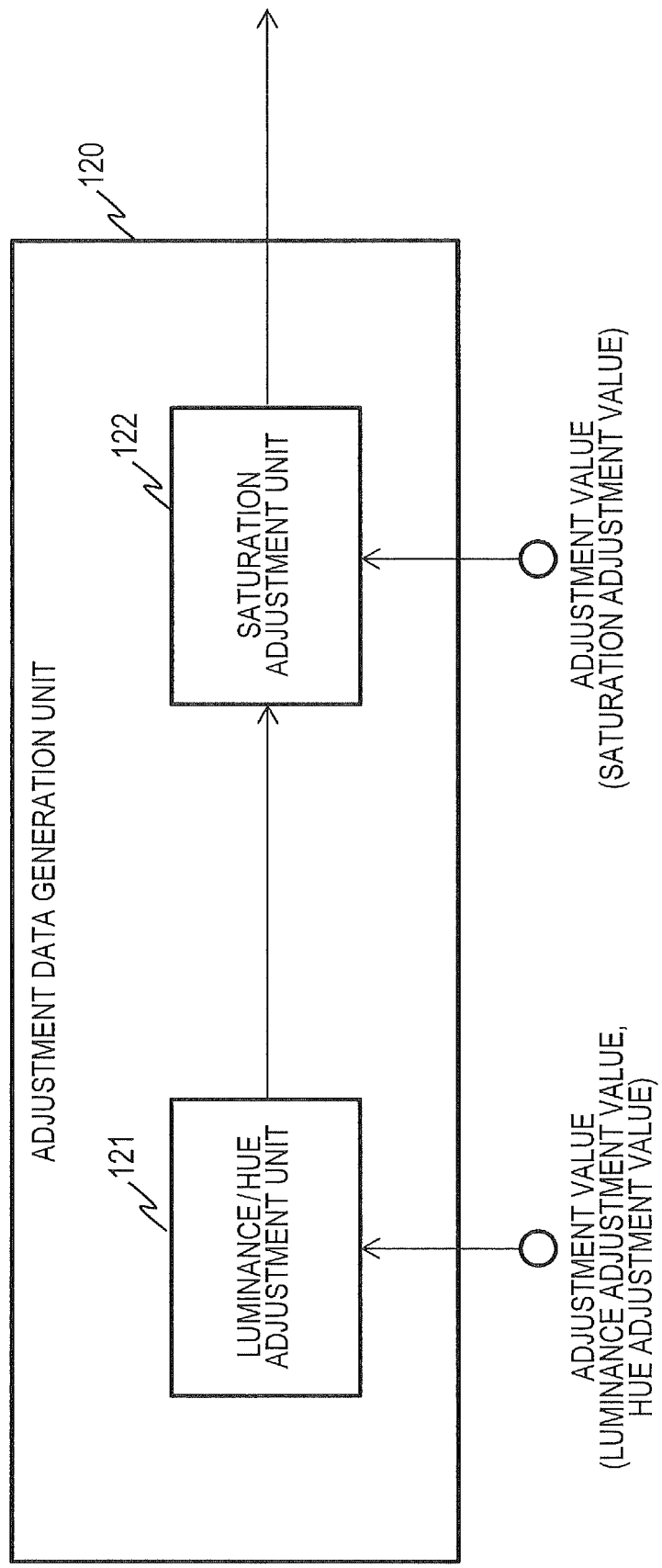
FIG. 3 is a block diagram illustrating a detailed configuration of an adjustment data generation unit 120 according to Embodiment 1.

FIG. 3 is a block diagram illustrating the detailed configuration of the adjustment data generation unit 120. The adjustment data generation unit 120 is configured with a luminance/hue adjustment unit 121 and a saturation adjustment unit 122. The luminance/hue adjustment unit 121 is supplied with an adjustment value on luminance and an adjustment value on hue of each of the 6-axis vertex colors, that is, 12 kinds of adjustment values. The saturation adjustment unit 122 is supplied with an adjustment value on saturation of each of the 6-axis vertex colors, that is, six kinds of adjustment values. When only a part of adjustment values is supplied, an item not supplied with an adjustment value may be regarded as being supplied with a default value (a value which does not produce a change about the color attribute).

The configuration illustrated in FIG. 3 performs all adjustments of luminance, hue, and saturation; however, the configuration is not restricted to the present one, but a configuration which performs adjustment according to an application may be sufficient. That is, the adjustment data generation unit 120 may be configured so as to generate the table data which adjusts, for example, luminance and saturation, luminance and hue, hue and saturation, luminance only, saturation only, or hue only. That is to say, the configuration of the adjustment data generation unit 120 needs only to include at least a part of the adjustment units for luminance, hue, and saturation.

The luminance/hue adjustment unit 121 calculates the RGB coordinates after the adjustment of luminance and hue of each of the 6-axis vertices, and the RGB coordinates after adjustment of the luminance and hue of an arbitrary lattice point (also called a target point) in the RGB color space. The saturation adjustment unit 122 calculates the RGB coordinates after adjustment of the saturation of each of the 6-axis vertices, and the RGB coordinates after adjustment of the saturation of an arbitrary lattice point (a target point) in the RGB color space. Hereinafter, the details of the luminance/hue adjustment unit 121 and the saturation adjustment unit 122 are explained.

In advance of the detailed explanation of the luminance/hue adjustment unit 121, the adjustment value supplied to the luminance/hue adjustment unit 121 and the definition of the adjustment of the luminance/hue adjustment unit 121 are explained with reference to FIGS. 4-9.

Figure 4:
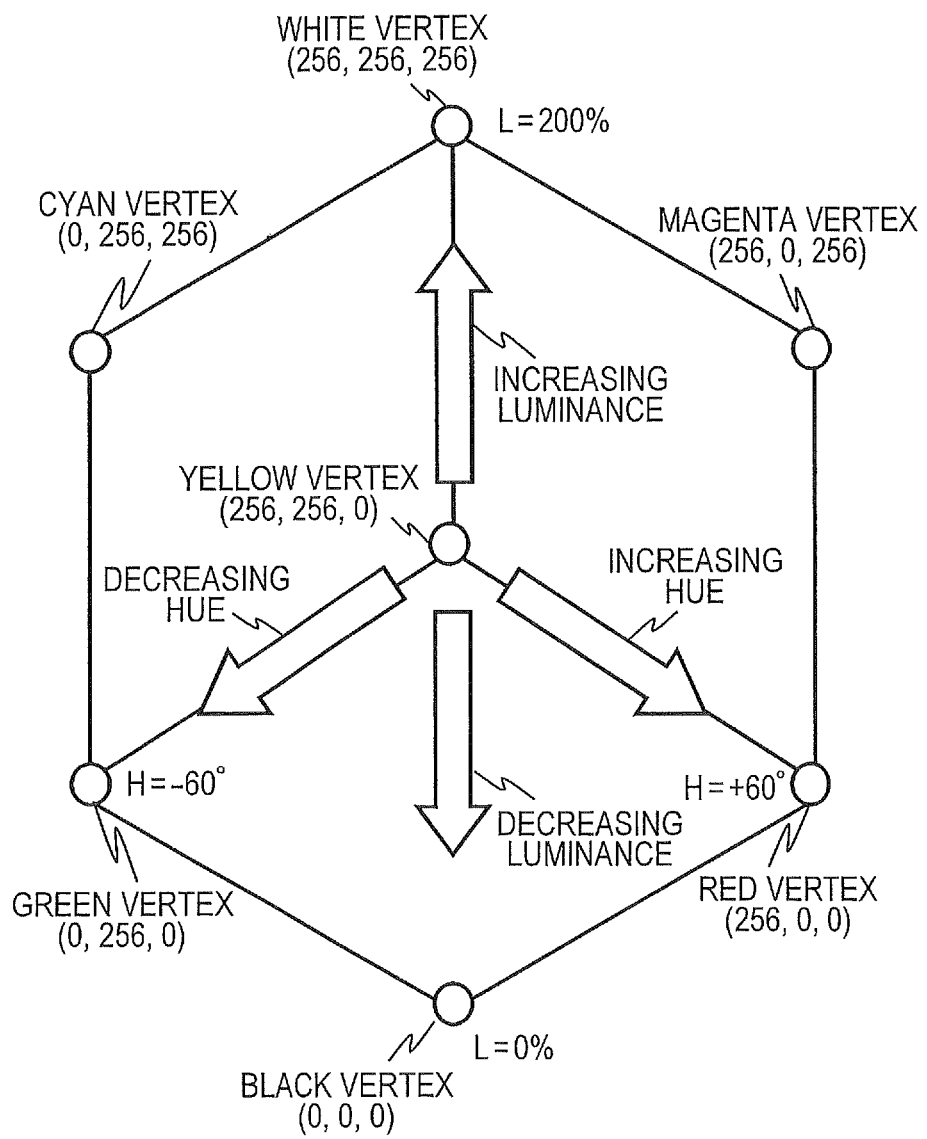
FIG. 4 is a drawing illustrating an adjustment direction of luminance and hue of a Y vertex by means of an image processing device 100 according to Embodiment 1.

FIG. 4 is a drawing arranging the Y vertex at the center and the white vertex at the top, in a cube which illustrates the RGB color space with the 6-axis vertex colors of RGBYCM plus the white vertex (256, 256, 256) and the black vertex (0, 0, 0). In the following explanation and the drawings, it is assumed that each value of RGB takes a value of 0-256, for convenience of explanation. Generally, in 8-bit accuracy, each value of RGB takes a value of 0-255. Even in the present case, what is necessary is just to perform processing and calculation which are equivalent to the explanation given in the following.

As illustrated in FIG. 4, when the luminance of the yellow (Y) is adjusted, the image processing device 100 according to the present embodiment defines such that when increasing brightness, the color is moved closer to the white vertex (256, 256, 256), and when decreasing brightness, the color is moved closer to the black vertex (0, 0, 0).

As illustrated in FIG. 4, when the hue of the yellow (Y) is adjusted, the image processing device 100 according to the present embodiment defines such that when increasing hue, the color is moved closer to the R vertex (256, 0, 0), and when decreasing hue, the color is moved closer to the G vertex (0, 256, 0).

The amount of adjustment of luminance is defined such that the value (256, 256, 0) before the adjustment is 100%, the state where the Y vertex is moved to the white vertex is 200%, and the state where the Y vertex is moved to the black vertex is 0%. The amount of adjustment of hue is defined such that the value (256, 256, 0) before the adjustment is 0°, the state where the Y vertex is moved to the G vertex is −60°, and the state where the Y vertex is moved to the R vertex is +60°.

Figure 5:
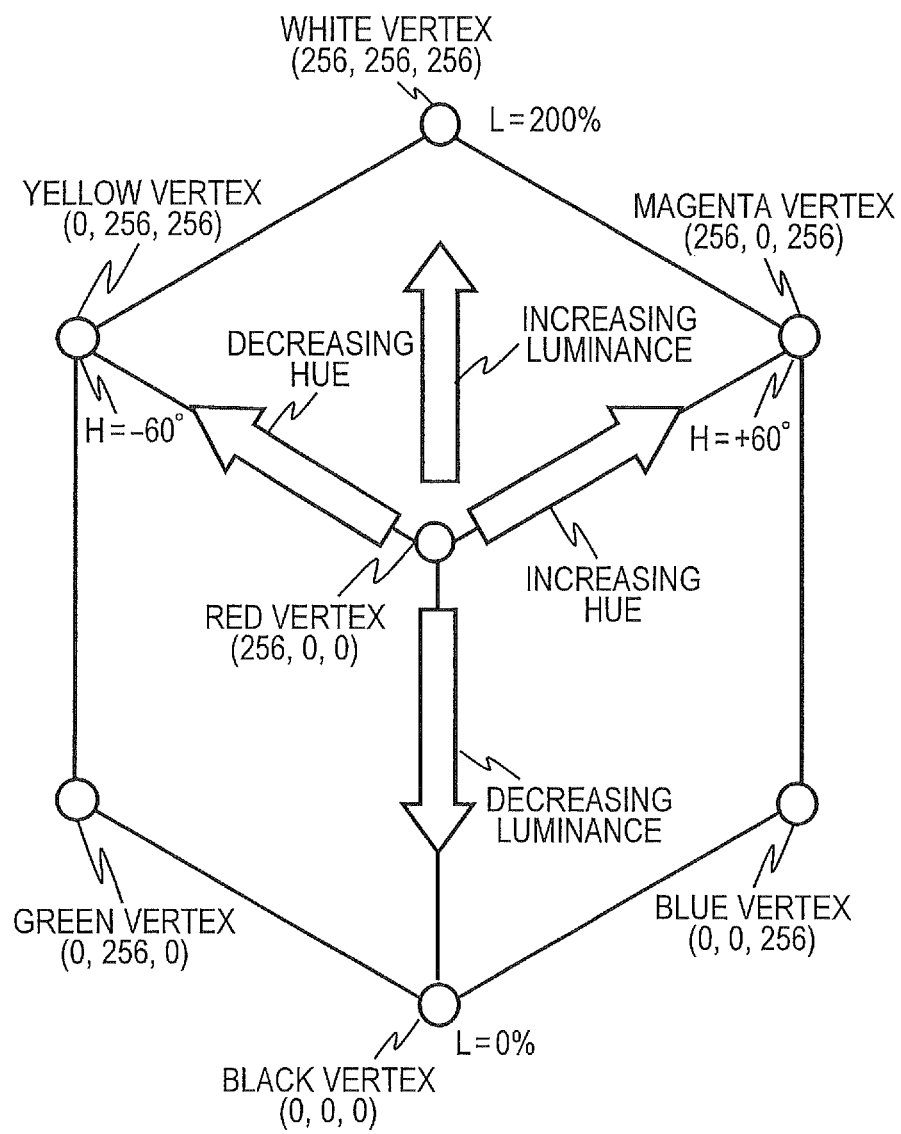
FIG. 5 is a drawing illustrating an adjustment direction of luminance and hue of an R vertex by means of the image processing device 100 according to Embodiment 1.

FIGS. 5-9 are drawings illustrating the adjustment directions and amount of adjustments of luminance and hue of each of the 6-axis vertex colors other than the yellow (Y). FIG. 5 is a drawing illustrating the adjustment directions and the amount of adjustment of luminance and hue of the red (R). The adjustment directions of luminance and hue of the red (R) are as illustrated in FIG. 5. The amount of adjustment of luminance is defined such that the value (256, 0, 0) before the adjustment is 100%, the state where the R vertex is moved to the white vertex is 200%, and the state where the R vertex is moved to the black vertex is 0%. The amount of adjustment of hue is defined such that the value (256, 0, 0) before the adjustment is 0°, the state where the R vertex is moved to the Y vertex is −60°, and the state where the R vertex is moved to the M vertex is +60°.

Figure 6:
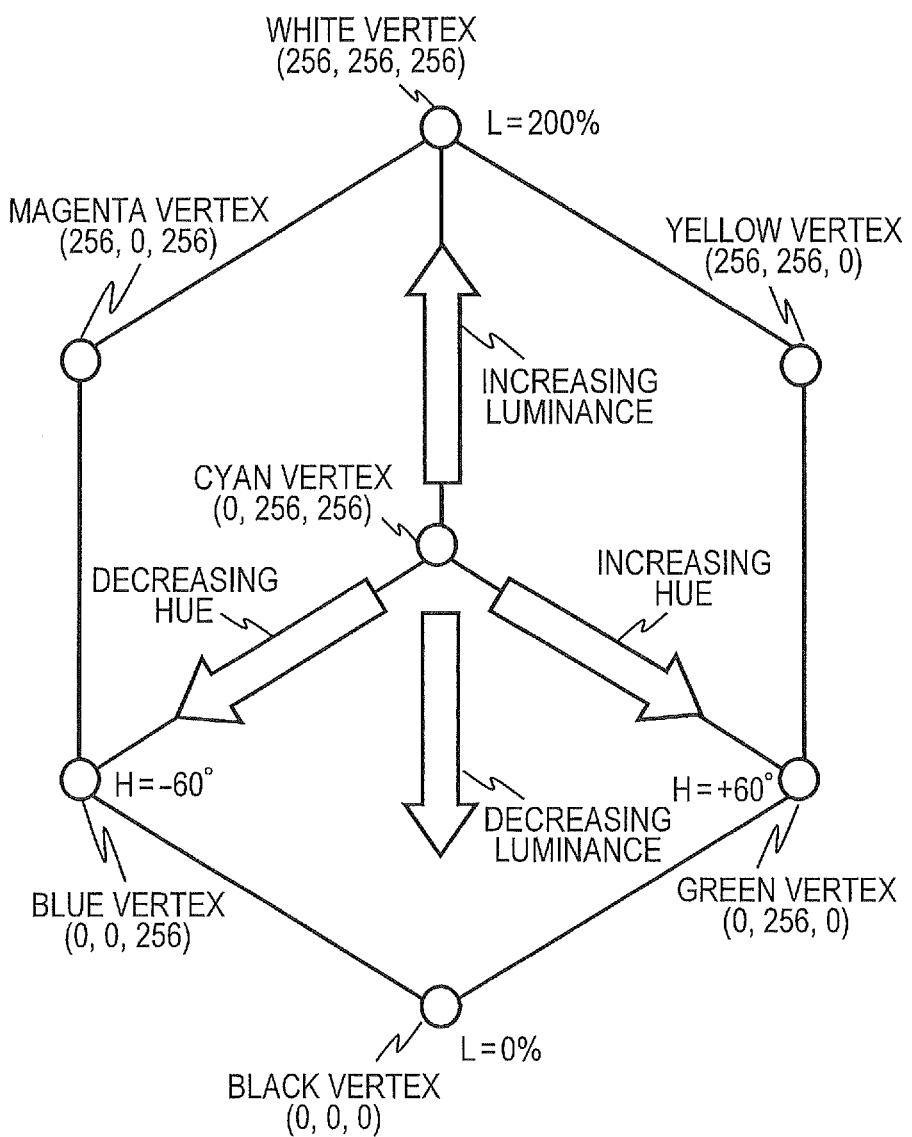
FIG. 6 is a drawing illustrating an adjustment direction of luminance and hue of a C vertex by means of the image processing device 100 according to Embodiment 1.

FIG. 6 is a drawing illustrating the adjustment directions and the amount of adjustment of luminance and hue of the cyan (C). The adjustment directions of luminance and hue of the cyan (C) are as illustrated in FIG. 6. The amount of adjustment of luminance is defined such that the value (0, 256, 256) before the adjustment is 100%, the state where the C vertex is moved to the white vertex is 200%, and the state where the C vertex is moved to the black vertex is 0%. The amount of adjustment of hue is defined such that the value (0, 256, 256) before the adjustment is 0°, the state where the C vertex is moved to the B vertex is −60°, and the state where the C vertex is moved to the G vertex is +60°.

Figure 7:
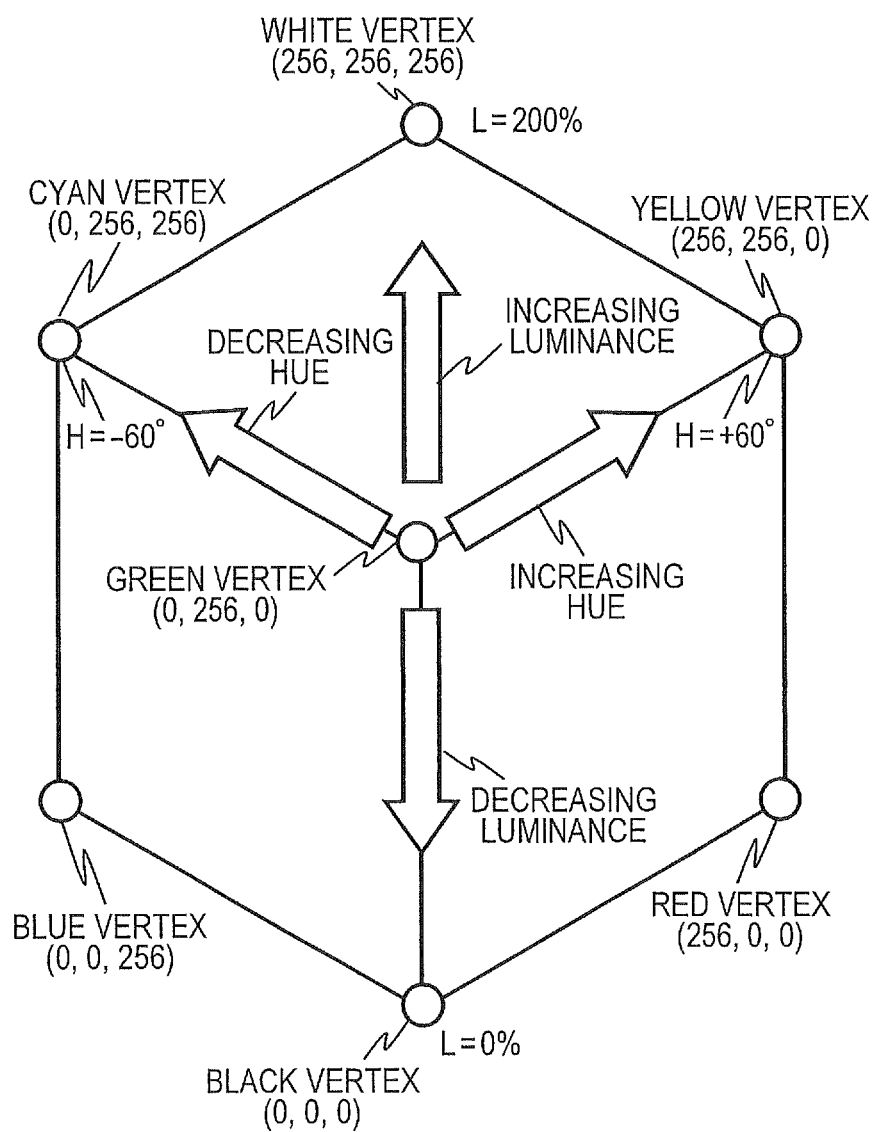
FIG. 7 is a drawing illustrating an adjustment direction of luminance and hue of a G vertex by means of the image processing device 100 according to Embodiment 1.

FIG. 7 is a drawing illustrating the adjustment directions and the amount of adjustment of luminance and hue of the green (G). The adjustment directions of luminance and hue of the green (G) are as illustrated in FIG. 7. The amount of adjustment of luminance is defined such that the value (0, 256, 0) before the adjustment is 100%, the state where the G vertex is moved to the white vertex is 200%, and the state where the G vertex is moved to the black vertex is 0%. The amount of adjustment of hue is defined such that the value (0, 256, 0) before the adjustment is 0°, the state where the G vertex is moved to the C vertex is −60°, and the state where the G vertex is moved to the Y vertex is +60°.

Figure 8:
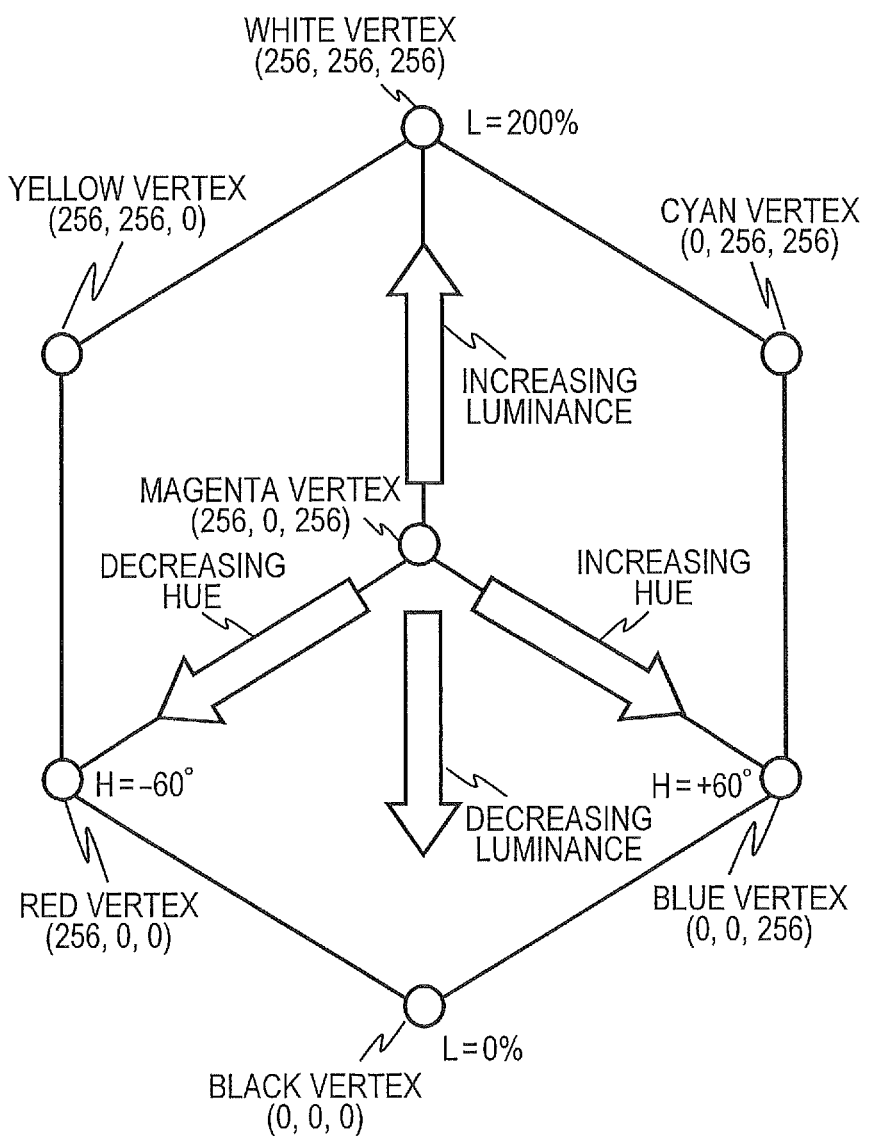
FIG. 8 is a drawing illustrating an adjustment direction of luminance and hue of an M vertex by means of the image processing device 100 according to Embodiment 1.

FIG. 8 is a drawing illustrating the adjustment directions and the amount of adjustment of luminance and hue of the magenta (M). The adjustment directions of luminance and hue of the magenta (M) are as illustrated in FIG. 8. The amount of adjustment of luminance is defined such that the value (256, 0, 256) before the adjustment is 100%, the state where the M vertex is moved to the white vertex is 200%, and the state where the M vertex is moved to the black vertex is 0%. The amount of adjustment of hue is defined such that the value (256, 0, 256) before the adjustment is 0°, the state where the M vertex is moved to the R vertex is −60°, and the state where the M vertex is moved to the B vertex is +60°.

Figure 9:
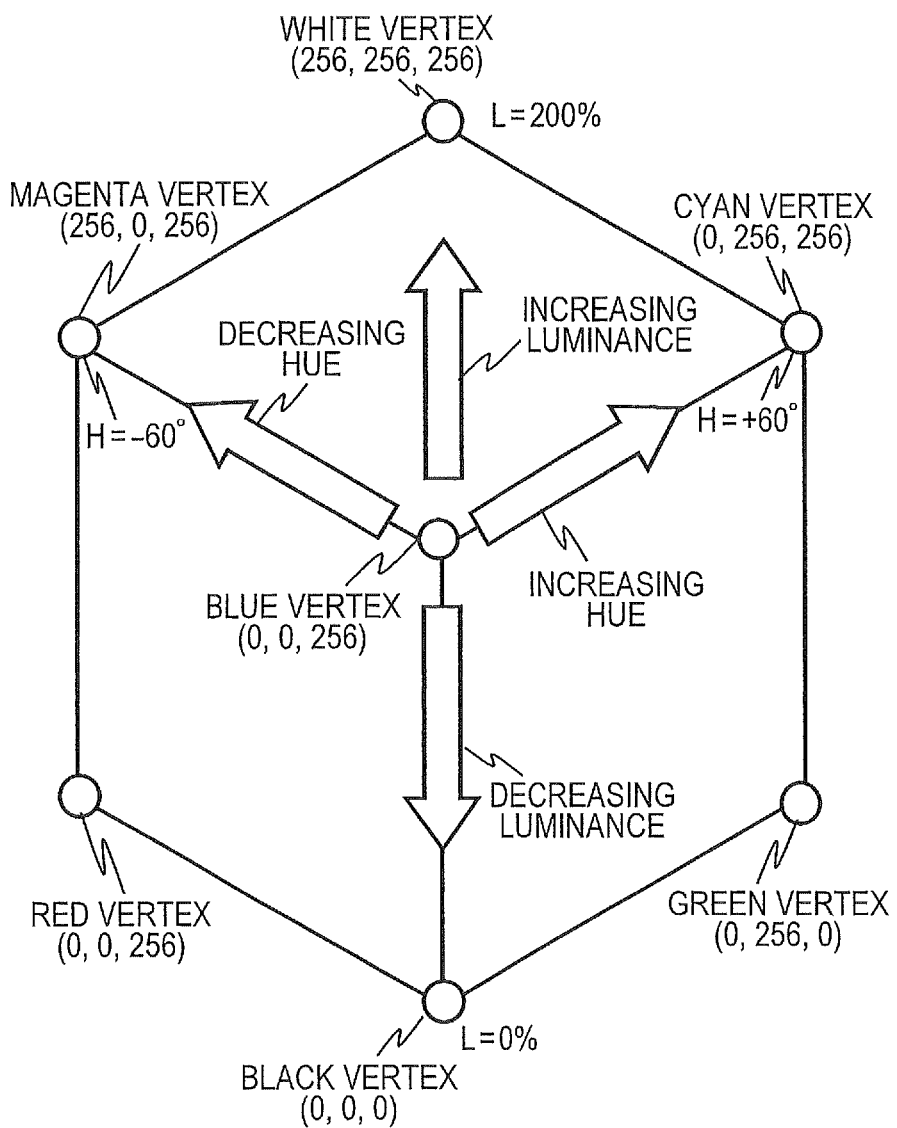
FIG. 9 is a drawing illustrating an adjustment direction of luminance and hue of a B vertex by means of the image processing device 100 according to Embodiment 1.

FIG. 9 is a drawing illustrating the adjustment directions and the amount of adjustment of luminance and hue of the blue (B). The adjustment directions of luminance and hue of the blue (B) are as illustrated in FIG. 9. The amount of adjustment of luminance is defined such that the value (0, 0, 256) before the adjustment is 100%, the state where the B vertex is moved to the white vertex is 200%, and the state where the B vertex is moved to the black vertex is 0%. The amount of adjustment of hue is defined such that the value (0, 0, 256) before the adjustment is 0°, the state where the B vertex is moved to the M vertex is −60°, and the state where the B vertex is moved to the C vertex is +60°.

The meaning that the adjustment directions are set as illustrated in FIGS. 4-9 is explained with reference to FIG. 4 (adjustment of Y) as an example. The adjustment of luminance can also be realized by moving the Y vertex close to coordinates (for example, (256, 256, 250)) other than the white vertex. However, as the adjustment direction deviates from a straight line which connects the white vertex (256, 256, 256) and the black vertex (0, 0, 0), influence will be exerted on color attributes other than luminance (that is, hue and saturation). Same applies to hue. On the other hand, when the Y vertex is moved in the direction to each vertex as illustrated in FIG. 4, it is possible to perform the adjustment of luminance without affecting hue and saturation, and it is also possible to perform the adjustment of hue without affecting luminance and saturation. That is, it is possible to perform the adjustment of luminance and hue independently of other color attributes.

Figure 10:
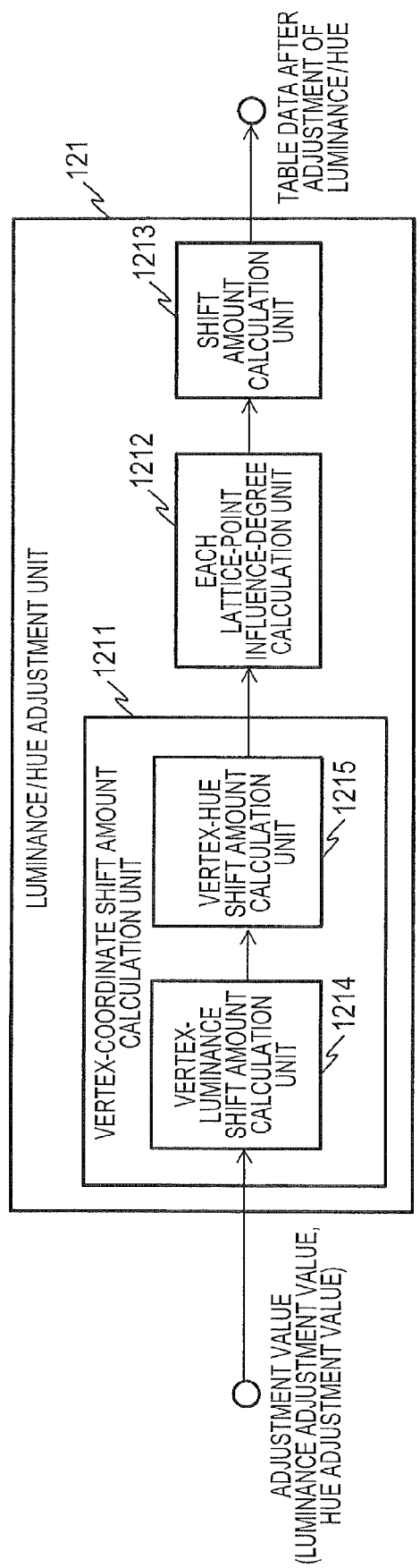
FIG. 10 is a block diagram illustrating a configuration of a luminance/hue adjustment unit 121 according to Embodiment 1.

Next, with reference to FIG. 10, the configuration of the luminance/hue adjustment unit 121 and processing of each processing unit are explained. FIG. 10 is a block diagram illustrating an internal configuration of the luminance/hue adjustment unit 121. The luminance/hue adjustment unit 121 is configured with a vertex-coordinate shift amount calculation unit 1211, an each lattice-point influence-degree calculation unit 1212, and a shift amount calculation unit 1213. The vertex-coordinate shift amount calculation unit 1211 is configured with a vertex-luminance shift amount calculation unit 1214 and a vertex-hue shift amount calculation unit 1215.

The vertex-coordinate shift amount calculation unit 1211 calculates the shift amount of each of the 6-axis vertices within the RGB color space. The shift amount of each of the 6-axis vertices reflects completely the adjustment value set by a user. When described in detail, the vertex-luminance shift amount calculation unit 1214 of the vertex-coordinate shift amount calculation unit 1211 calculates the shift amount after the luminance adjustment of each of the 6-axis vertices, based on the adjustment value on luminance of each of the six axes. Next, the vertex-hue shift amount calculation unit 1215 of the vertex-coordinate shift amount calculation unit 1211 calculates the shift amount after the luminance/hue adjustment of each of the six axes, based on the shift amount calculated by the vertex-luminance shift amount calculation unit 1214 and the adjustment value on hue of each of the six axes.

The calculation in the vertex-luminance shift amount calculation unit 1214 is performed as follows. The calculation of shift amount of the Y vertex is explained as an example. The following describes the definition of the luminance adjustment value of the Y vertex and the shift amount of each component at the time of the luminance adjustment of the Y vertex, and also describes the method of calculation of the shift amount of each component at the time of the luminance adjustment of the Y vertex.

Y_L: A luminance adjustment value of Y (%)
ΔRyl: R-component shift amount after the luminance adjustment of the Y vertex
ΔGyl: G-component shift amount after the luminance adjustment of the Y vertex
ΔByl: B-component shift amount after the luminance adjustment of the Y vertex (1) Y_L≥100%

In this case, corresponding to the adjustment value of Y_L, the vertex-luminance shift amount calculation unit 1214 calculates ΔByl so that the Y vertex may shift toward the white vertex.

(2) Y_L<100%

In this case, corresponding to the adjustment value of Y_L, the vertex-luminance shift amount calculation unit 1214 calculates ΔRyl and ΔGyl so that the Y vertex may shift toward the black vertex.

Figure 11:
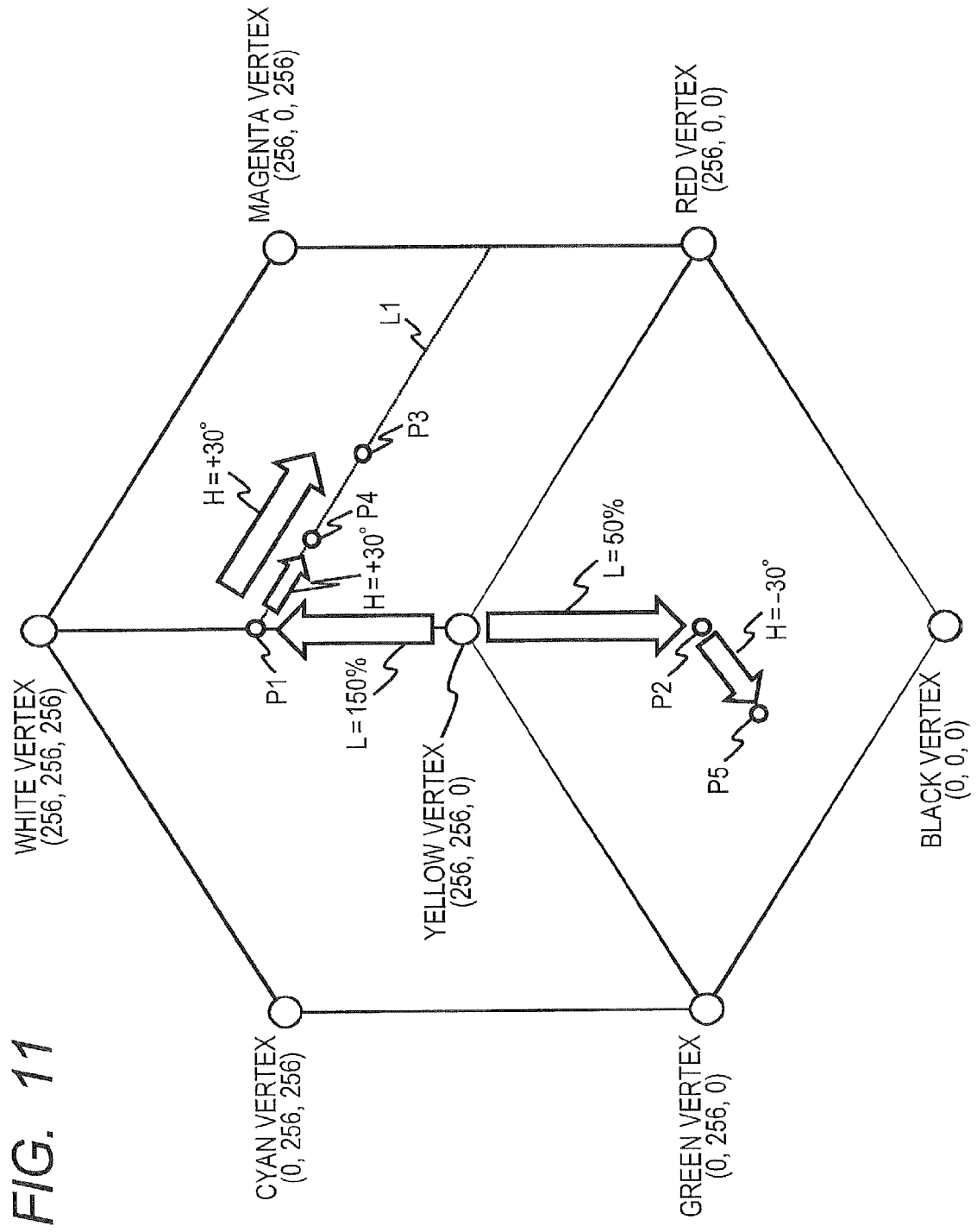
FIG. 11 is a conceptual diagram illustrating adjustment of the luminance/hue adjustment unit 121 according to Embodiment 1.

FIG. 11 illustrates the concept of calculation of the shift amount after the luminance adjustment of the Y vertex. FIG. 11 also illustrates the concept of calculation of the shift amount after the hue adjustment of the Y vertex, which will be described later. As illustrated in FIG. 11, the vertex-luminance shift amount calculation unit 1214 shifts the RGB value of the Y vertex corresponding to an adjustment value (see P1 and P2 in FIG. 11). For example, when the adjustment value of the luminance of the Y vertex is 150%, the vertex-luminance shift amount calculation unit 1214 determines to increase the B value by 128 and sets it as the shift amount of the B value.

The vertex-luminance shift amount calculation unit 1214 calculates the shift amount after the luminance adjustment of each of other 6-axis vertices in the same manner as the calculation of the shift amount of the Y vertex. The following describes the definition of the luminance adjustment value of each of the 6-axis vertices and the shift amount of each component at the time of the luminance adjustment of each of the 6-axis vertices. The shift amount of each component of each of the 6-axis vertices may be calculated according to the shift direction illustrated in FIGS. 4-9 in the same manner as the calculation of the shift amount of the Y vertex. Therefore, the details of the calculation of shift amounts of vertices other than the Y vertex are omitted.

The following describes the definition of the luminance adjustment value of the R vertex and the shift amount of each component at the time of the luminance adjustment of the R vertex.

R_L: A luminance adjustment value of R (%)
ΔRrl: R-component shift amount after the luminance adjustment of the R vertex
ΔGrl: G-component shift amount after the luminance adjustment of the R vertex
ΔBrl: B-component shift amount after the luminance adjustment of the R vertex The following describes the definition of the luminance adjustment value of the G vertex and the shift amount of each component at the time of the luminance adjustment of the G vertex.

G_L: A luminance adjustment value of G (%)
ΔRgl: R-component shift amount after the luminance adjustment of the G vertex
ΔGgl: G-component shift amount after the luminance adjustment of the G vertex
ΔBgl: B-component shift amount after the luminance adjustment of the G vertex The following describes the definition of the luminance adjustment value of the B vertex and the shift amount of each component at the time of the luminance adjustment of the B vertex.

B_L: A luminance adjustment value of B (%)
ΔRbl: R-component shift amount after the luminance adjustment of the B vertex
ΔGbl: G-component shift amount after the luminance adjustment of the B vertex
ΔBbl: B-component shift amount after the luminance adjustment of the B vertex The following describes the definition of the luminance adjustment value of the C vertex and the shift amount of each component at the time of the luminance adjustment of the C vertex.

C_L: A luminance adjustment value of C (%)
ΔRcl: R-component shift amount after the luminance adjustment of the C vertex
ΔGcl: G-component shift amount after the luminance adjustment of the C vertex
ΔBcl: B-component shift amount after the luminance adjustment of the C vertex The following describes the definition of the luminance adjustment value of the M vertex and the shift amount of each component at the time of the luminance adjustment of the M vertex.

M_L: A luminance adjustment value of M (%)
ΔRml: R-component shift amount after the luminance adjustment of the M vertex
ΔGml: G-component shift amount after the luminance adjustment of the M vertex
ΔBml: B-component shift amount after the luminance adjustment of the M vertex The vertex-luminance shift amount calculation unit 1214 supplies the shift amount of each component calculated of each of the 6-axis vertices (18 parameters) to the vertex-hue shift amount calculation unit 1215.

The vertex-hue shift amount calculation unit 1215 adds the shift amount obtained by the hue adjustment to the shift amount of each component of each of the 6-axis vertices which the vertex-luminance shift amount calculation unit 1214 has calculated. Hereinafter, the calculation of shift amount of the Y vertex is explained as an example. The following describes the definition of the hue adjustment value of the Y vertex and the shift amount of each component after the luminance/hue adjustment of the Y vertex, and also describes the method of calculation of the shift amount of each component after the luminance/hue adjustment of the Y vertex.

Y_H: a hue adjustment value of Y (%)
ΔRyh: R-component shift amount after the luminance/hue adjustment of the Y vertex
ΔGyh: G-component shift amount after the luminance/hue adjustment of the Y vertex
ΔByh: B-component shift amount after the luminance/hue adjustment of the Y vertex (1) Y_H 0° (in the direction of Red)

In this case, as for ΔRyh and ΔByh, ΔRyl and ΔByl are employed as they are (the value is not changed). The vertex-hue shift amount calculation unit 1215 calculates ΔGyh so that the Y vertex after the luminance adjustment may shift in parallel with the straight line connecting the Y vertex and the R vertex, corresponding to the adjustment value of Y_H.

(2) Y_H<0° (in the direction of Green)

In this case, as for ΔGyh and ΔByh, ΔGyl and ΔByl are employed as they are (the value is not changed). The vertex-hue shift amount calculation unit 1215 calculates ΔRyh so that the Y vertex after the luminance adjustment may shift in parallel with the straight line connecting the Y vertex and the G vertex, corresponding to the adjustment value of Y_H.

Further explanation will be made with reference to FIG. 11. Points P1 and P2 indicate the Y vertex after the luminance adjustment. The vertex-hue shift amount calculation unit 1215 shifts the Y vertex after the luminance adjustment, corresponding to the adjustment value of Y_H.

When shifting the point P1 in the direction of increasing hue (Y_H=30°), the vertex-hue shift amount calculation unit 1215 calculates ΔGyh corresponding to the coordinates of a point P3 shifted in parallel with the straight line connecting the Y vertex and the R vertex. Here, the point P3 is a point where the G value of the RGB value of the point P1 is subtracted by the value (128) corresponding to the adjustment value of hue (Y_H=30°).

In this connection, the vertex-hue shift amount calculation unit 1215 may calculate a point on the coordinates (that is, the shift amount of each component) after the luminance/hue adjustment, by taking into consideration not only the adjustment value of hue (Y_H=30°) but also the adjustment value of luminance. The point P1 (the Y vertex after the luminance adjustment) is a point where the Y vertex is shifted in the direction of the white vertex by the distance of half a segment connecting the Y vertex and the white vertex. Here, consider a segment L1 which is parallel with a straight line connecting the Y vertex and the R vertex and which passes the point P1. The segment L1 is located closer to the white vertex and the M vertex, compared with the segment connecting the Y vertex and the R vertex. Therefore, when the point P1 is shifted in the direction to the M vertex (or the R vertex) from the median point of the segment L1, the area of Magenta will be affected. The hue adjustment of the Y vertex in the plus direction is the shifting in the direction to the R vertex which is an adjoining vertex; accordingly, it is not appropriate to affect the area concerning the M vertex which is not an adjoining vertex. Therefore, the vertex-hue shift amount calculation unit 1215 determines that the dynamic range of the hue adjustment is up to the point P3 (the median point of the segment L1) so that the area of Magenta may not be affected (that is, when Y_H=60°, the coordinates of the Y vertex after the adjustment are set at the point P3). Here, the dynamic range means the maximum distance that the Y vertex can shift in the hue adjustment. Then, the vertex-hue shift amount calculation unit 1215 calculates a point P4 which is shifted corresponding to the dynamic range. That is, the vertex-hue shift amount calculation unit 1215 decreases the dynamic range of each of the 6-axis vertices (distance allowed to shift for each of the 6-axis vertices) by the hue adjustment, as the shift amount regarding luminance becomes large. By performing the calculation of shift amount of each of the 6-axis vertices in consideration of the shift amount of luminance in this way, it is possible to avoid excessive adjustment of hue; accordingly it becomes possible to convert each of the 6-axis vertices into a suitable RGB value.

When shifting the point P2 in the direction of decreasing hue, the vertex-hue shift amount calculation unit 1215 calculates ΔRyh corresponding to the coordinates of a point P5 shifted in parallel with the straight line connecting the Y vertex and the G vertex. Also in the present case (shift to the direction of decreasing hue), the vertex-hue shift amount calculation unit 1215 may calculate a point on the coordinates (that is, the shift amount of each component) after the luminance/hue adjustment, by taking into consideration not only the adjustment value of hue (Y_H=30°) but also the adjustment value of luminance.

The vertex-hue shift amount calculation unit 1215 calculates the shift amount after the adjustment of luminance and hue of each of other 6-axis vertices, in the same manner as the calculation of the shift amount of the Y vertex. The following describes the definition of the hue adjustment value of each of the 6-axis vertices and the shift amount of each component after the adjustment of luminance and hue of each of the 6-axis vertices. The shift amount of each component of each of the 6-axis vertices may be calculated according to the shift direction illustrated in FIGS. 4-9 in the same manner as the calculation of the shift amount of the Y vertex.

The hue adjustment value of the R vertex and the shift amount of each component after the adjustment of luminance and hue of the R vertex are defined as follows.

R_H: a hue adjustment value of R (%)
ΔRrh: R-component shift amount after the luminance/hue adjustment of the R vertex
ΔGrh: G-component shift amount after the luminance/hue adjustment of the R vertex
ΔBrh: B-component shift amount after the luminance/hue adjustment of the R vertex The hue adjustment value of the G vertex and the shift amount of each component after the adjustment of luminance and hue of the G vertex are defined as follows.

G_H: a hue adjustment value of G (%)
ΔRgh: R-component shift amount after the luminance/hue adjustment of the G vertex
ΔGgh: G-component shift amount after the luminance/hue adjustment of the G vertex
ΔBgh: B-component shift amount after the luminance/hue adjustment of the G vertex The hue adjustment value of the B vertex and the shift amount of each component after the adjustment of luminance and hue of the B vertex are defined as follows.

B_H: a hue adjustment value of B (%)
ΔRbh: R-component shift amount after the luminance/hue adjustment of the B vertex
ΔGbh: G-component shift amount after the luminance/hue adjustment of the B vertex
ΔBbh: B-component shift amount after the luminance/hue adjustment of the B vertex The hue adjustment value of the C vertex and the shift amount of each component after the adjustment of luminance and hue of the C vertex are defined as follows.

C_H: a hue adjustment value of C (%)
ΔRch: R-component shift amount after the luminance/hue adjustment of the C vertex
ΔGch: G-component shift amount after the luminance/hue adjustment of the C vertex
ΔBch: B-component shift amount after the luminance/hue adjustment of the C vertex The hue adjustment value of the M vertex and the shift amount of each component after the adjustment of luminance and hue of the M vertex are defined as follows.

M_H: a hue adjustment value of M (%)
ΔRmh: R-component shift amount after the luminance/hue adjustment of the M vertex
ΔGmh: G-component shift amount after the luminance/hue adjustment of the M vertex
ΔBmh: B-component shift amount after the luminance/hue adjustment of the M vertex The vertex-hue shift amount calculation unit 1215 supplies the calculated shift amount of each RGB component of each of the 6-axis vertices (18 pieces of values) to the each lattice-point influence-degree calculation unit 1212.

Figure 21:
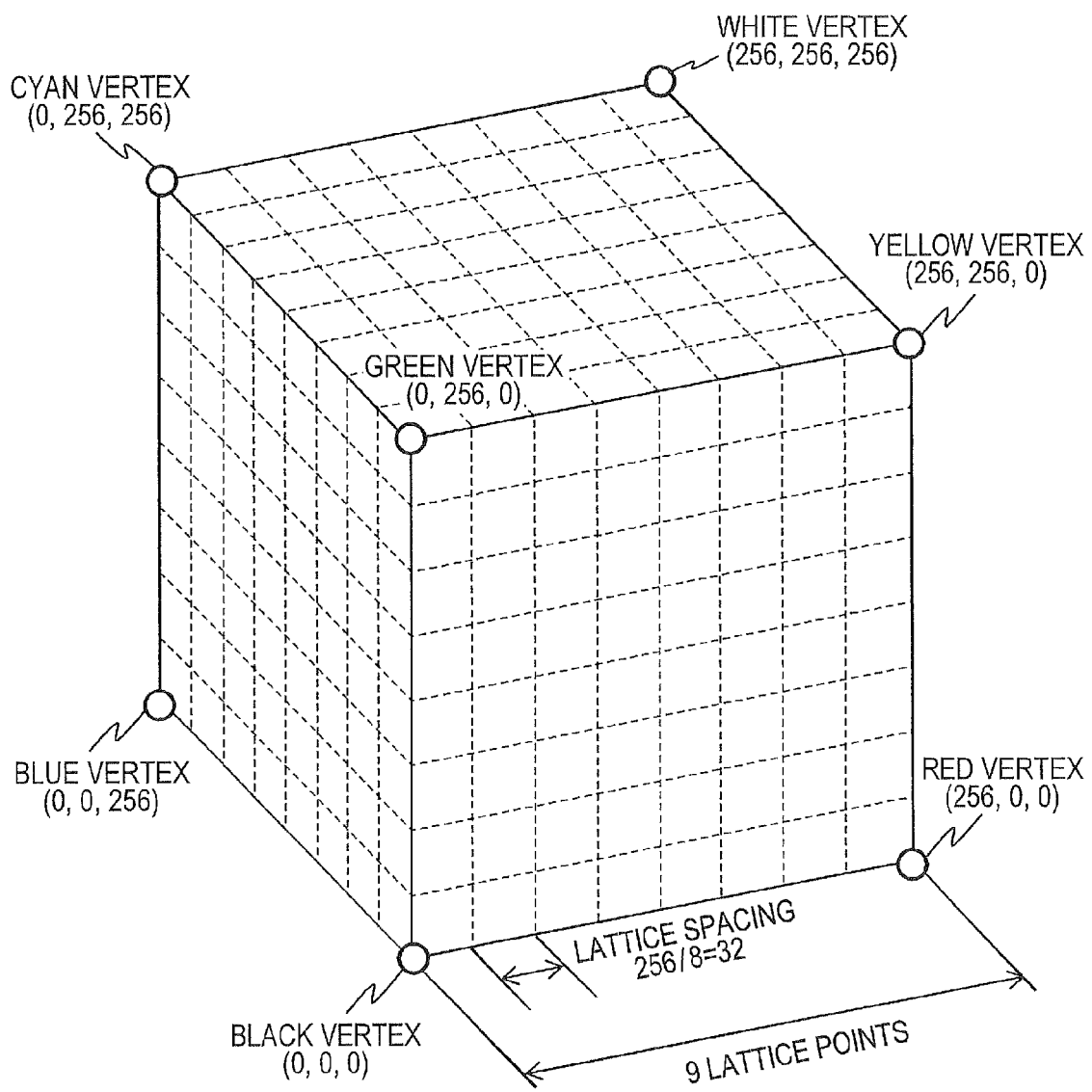
FIG. 21 is a drawing illustrating the RGB color space.

The each lattice-point influence-degree calculation unit 1212 calculates the degree of influence for each of the six axes of each lattice point in the RGB color space (FIG. 21). The each lattice-point influence-degree calculation unit 1212 calculates the degree of influence of each lattice point on luminance and hue (it corresponds to the luminance/hue influence-degree calculation unit in the claims). First, the definition of the degree of influence and the meaning of calculating the degree of influence are explained.

The degree of influence indicates the degree of how much influences each lattice point in the RGB color space receives, or in other words, how much each lattice point follows shifting, in response to shifting of each of the 6-axis vertices in the RGB color space. In the 6-axis color control, not only each of the 6-axis vertices shifts in the RGB color space in response to the adjustment value inputted by the users, but a surrounding color also shifts in the RGB color space in response to shifting of each of the 6-axis vertices. This is for compensating the continuity in the RGB color space, preventing occurrence of color distortion, and realizing a natural color reproduction. Here, what determines the shift amount of each lattice point is the degree of influence.

For example, when performing the R axis adjustment, the degree of influence is 100% at the R vertex, becomes smaller as the distance from the R vertex increases, and becomes 0% at a lattice point distant more than a certain distance from the R vertex. The fact that the degree of influence is 0% at a certain lattice point means that shifting accompanying the shifting of the R vertex does not take place at the lattice point concerned, irrespective of the shift amount of the R vertex. The distance at which the degree of influence reaches 0% means a lattice point which should not be influenced by the shifting of the R vertex, that is, a lattice point having a color different from the red. The distance at which the degree of influence reaches 0% is described as a normalized distance Ls, in the following explanation. The following describes two examples of the setting of the normalized distance Ls.

In the first example, it is defined that the normalized distance Ls is the distance from a certain vertex (for example, the R vertex) to an adjoining vertex in the RGB color space. Assuming that each value of RGB is 8 bits, the normalized distance Ls is 256. That is to say, the normalized distance Ls is set depending on the bit width (the bit width of an R (G, B) value) in the RGB color space. The reason is to prevent the shifting of a certain vertex from affecting an adjoining vertex (a vertex indicating another color), because the 6-axis color control is the function of adjusting luminance, hue, and saturation for each of the six axes (colors).

Figure 12:
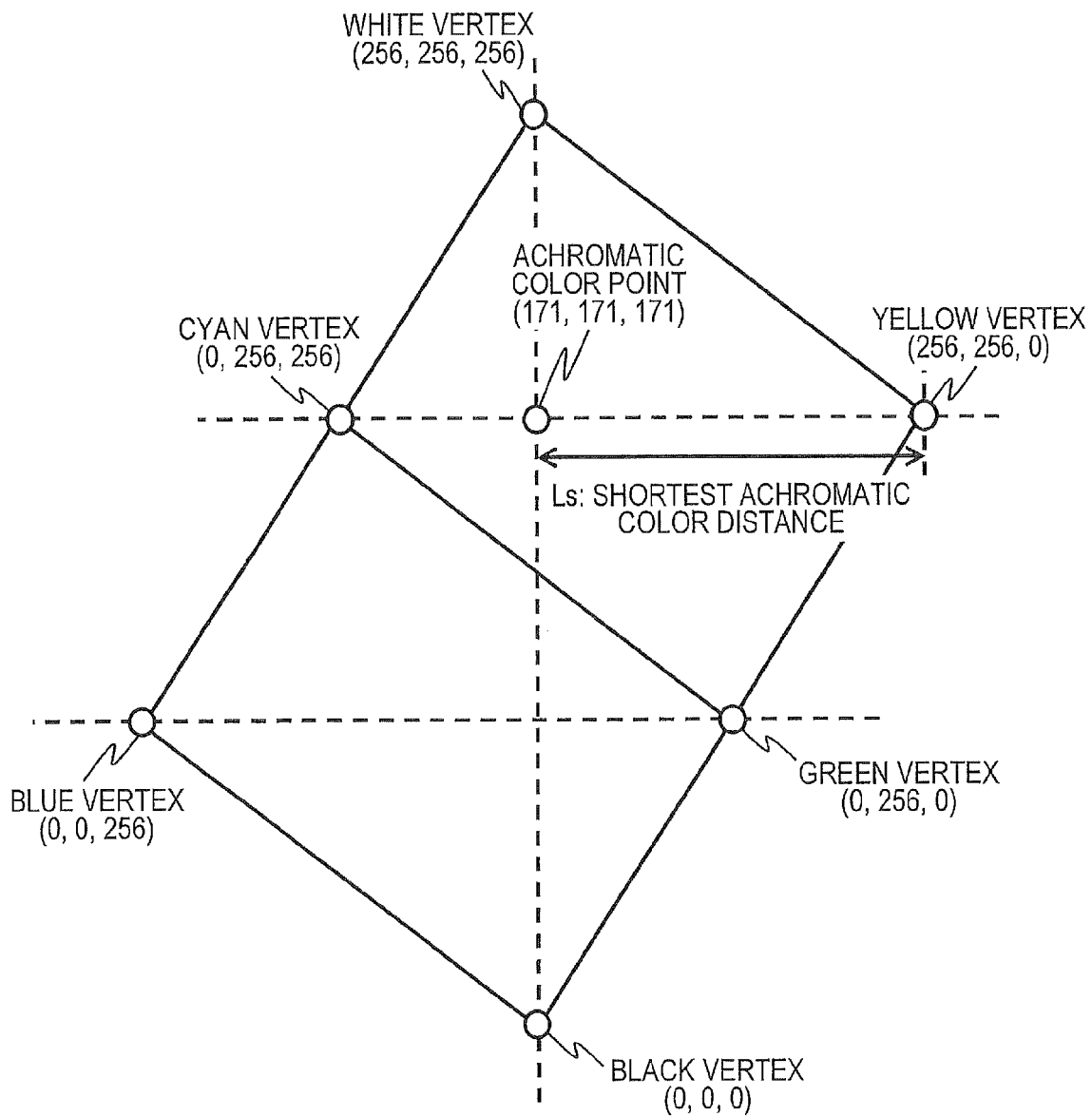
FIG. 12 is a conceptual diagram of an RGB color space.

In the second example, it is defined that the normalized distance Ls is the distance from each of the 6-axis vertices (for example, the R vertex) to the nearest achromatic color coordinates in the RGB color space. The details are explained with reference to FIG. 12. FIG. 12 is a drawing illustrating a cube indicating the RGB color space with eight vertices of each of the 6-axis vertices (RGBYCM) and the white and black vertices, and arranging the white vertex at the top and the black vertex at the bottom. The vertical direction indicates luminance, it becomes brighter as it goes upward, and it becomes darker as it goes downward. Moreover, respective lattice points arranged in the horizontal direction have the characteristics that the sum of the RGB coordinates, that is, an R value+a G value+a B value, becomes the same value. In short, FIG. 12 is a drawing in which the luminance of each point is expressed in terms of the sum of the R value, the G value, and the B value, and the vertical axis is expressed as an axis to indicate the luminance.

Seen from the Y vertex, the closest achromatic color coordinates in the RGB color space are (171, 171, 171), as illustrated in FIG. 12 and indicated by Equation 1 as follows.

$$\text{Luminance component of } Y \text{ vortex} = \frac{(256+256+0)}{3} = 171 \quad \text{(Equation 1)}$$

Here, it is defined that the achromatic color is a state where an R value, a G value, and a B value take the same value, as is the case with the black vertex (an R value, a G value, and a B value are 0) and the white vertex (an R value, a G value, and a B value are 256). Accordingly, in FIG. 12, it is defined that the axis connecting the white vertex and the black vertex is an achromatic color axis, and that a point which exists on this axis is an achromatic-color-coordinate point.

From the definitions described above, the distance from the Y vertex to the nearest achromatic color coordinates, that is, the normalized distance Ls, can be calculated to be 209 by the calculation of the distance between two points by Equation 2 as follows.

$$Ls = \sqrt{(256-171)^2 + (256-171)^2 + (0-171)^2} = 209 \quad \text{(Equation 2)}$$

The 6-axis color control is the function to adjust luminance, hue, and saturation for each of the six axes (colors), as described above. Therefore, it is possible to prevent coloring the area to which the color is not attached originally, by defining as the normalized distance Ls the distance from each of the 6-axis vertices to the point of an achromatic color, that is, the point to which a color is not attached.

In this connection, the setting of the above-described normalized distance Ls is just an example and various kinds of setting are possible depending on a user's request. For example, when a user wants to change only each of the 6-axis vertices and a color very close to each of the 6-axis vertices, it is sufficient to make the normalized distance Ls shorter than the distance described above. In this case, the user may input the information regarding the normalized distance Ls through the operation of the input interface (FIG. 2), for example.

Based on the above definition, the following explains the calculation of the degree of influence for each of the six axes of a lattice point in the RGB color space, by means of the each lattice-point influence-degree calculation unit 1212. Hereinafter, the adjustment of the R axis is explained as an example. The each lattice-point influence-degree calculation unit 1212 provides a definition about the degree of influence exerted on an arbitrary lattice point (target point) Dn due to the shifting of the R vertex, and calculates the degree of influence Ern exerted on the arbitrary lattice point Dn due to the R axis adjustment by the following processing (1)-(3). The following explains the processing (1)-(3).

(1) Calculation of the distance Lrn between the R vertex and the lattice point Dn
(2) Limit processing (processing when Lrn is larger than the normalized distance Ls)
(3) Calculation of the degree of influence Ern exerted on the lattice point Dn due to the R axis adjustment.
(1) Calculation of the distance Lrn between the R vertex and the lattice point Dn
 Coordinates of the R vertex: R=(256, 0, 0)
 Coordinates of an arbitrary lattice point before adjustment: Dn=(Rdn, Gdn, Bdn)

$$Lrn = \sqrt{(Rdn-256)^2 + Gdn^2 + Bdn^2} \quad \text{(Equation 3)}$$

(2) Limit processing (processing when Lrn is larger than the normalized distance Ls)
 Normalized distance: Ls
 Distance between the R vertex and the lattice point Dn after limit processing: Lrn'
 If Lrn≥Ls, then Lrn'=Ls
 If Lrn<Ls, then Lrn'=Lrn
(3) Calculation of the degree of influence Ern exerted on the lattice point Dn due to the R axis adjustment.

$$Ern = \frac{(Ls - Lrn')}{Ls} \quad \text{(Equation 4)}$$

As described above, the each lattice-point influence-degree calculation unit 1212 calculates the degree of influence Ern exerted on the lattice point Dn due to the R axis adjustment. The each lattice-point influence-degree calculation unit 1212 calculates similarly the degree of influence exerted on the lattice point Dn due to the adjustment of other colors (GB-CYM). The method of calculation is the same as that of the R axis adjustment described above, therefore, only the definition is provided in the following.

The definition about the G vertex is as follows.
(1) Calculation of the distance Lgn between the G vertex and the lattice point Dn
 Distance between the G vertex and the lattice point Dn: Lgn Coordinates of the G vertex: G=(0, 256, 0)
(2) Limit processing
 Distance between the G vertex and the lattice point Dn after limit processing: Lgn'
(3) Calculation of the degree of influence Egn exerted on the lattice point Dn due to the G axis adjustment
 The degree of influence exerted on the lattice point Dn due to G axis adjustment: Egn
The definition about the B vertex is as follows.
(1) Calculation of the distance Lbn between the B vertex and the lattice point Dn
 Distance between the B vertex and the lattice point Dn: Lbn
 Coordinates of the B vertex: B=(0, 0, 256)
(2) Limit processing
 Distance between the B vertex and the lattice point Dn after limit processing: Lbn'
(3) Calculation of the degree of influence Ebn exerted on the lattice point Dn due to the B axis adjustment
 The degree of influence exerted on the lattice point Dn due to B axis adjustment: Ebn
The definition about the Y vertex is as follows.
(1) Calculation of the distance Lyn between the Y vertex and the lattice point Dn
 Distance between the Y vertex and the lattice point Dn: Lyn
 Coordinates of the Y vertex: Y=(256, 256, 0)
(2) Limit processing
 Distance between the Y vertex and the lattice point Dn after limit processing: Lyn'
(3) Calculation of the degree of influence Eyn exerted on the lattice point Dn due to the Y axis adjustment The degree of influence due to the Y axis adjustment of the lattice point Dn: Eyn The definition about the C vertex is as follows.

(1) Calculation of the distance Lcn between the C vertex and the lattice point Dn Distance between the C vertex and the lattice point Dn: Lcn
Coordinates of the R vertex: R=(0, 256, 256)

(2) Limit processing

Distance between the C vertex and the lattice point Dn after limit processing: Lcn'

(3) Calculation of the degree of influence Egn exerted on the lattice point Dn due to the C axis adjustment The degree of influence due to the C axis adjustment of the lattice point Dn: Ecn The definition about the M vertex is as follows.

(1) Calculation of the distance Lmn between the M vertex and the lattice point Dn Distance between the M vertex and the lattice point Dn: Lmn Coordinates of the M vertex: M=(256, 0, 256)

(2) Limit processing

Distance between the M vertex and the lattice point Dn after limit processing: Lmn'

(3) Calculation of the degree of influence Emn exerted on the lattice point Dn due to the M axis adjustment.

The degree of influence due to the M axis adjustment of the lattice point Dn: Emn The each lattice-point influence-degree calculation unit 1212 calculates six kinds of degrees of influence on all the lattice points included in the RGB color space, and supplies the calculated degrees of influence to the shift amount calculation unit 1213.

The luminance/hue adjustment unit 121 calculates the coordinates (color) after the adjustment of luminance and hue of each lattice point in the shift amount calculation unit 1213. Specifically, the shift amount calculation unit 1213 performs the following processing (1) and (2) and calculates the coordinates of an arbitrary lattice point (target point) in the RGB color space after the adjustment of luminance and hue. The following explains the processing (1) and (2).

(1) Calculation of RGB shift amount accompanying the luminance/hue adjustment of the lattice point Dn (2) Calculation of coordinates after the luminance/hue adjustment of the lattice point Dn (1) Calculation of shift amount accompanying the luminance/hue adjustment of the lattice point Dn The shift amount calculation unit 1213 defines the shift amount of an R value, a G value, and a B value of the arbitrary lattice point Dn as follows, and calculates each shift amount according to Equation 5.

The shift amount of the arbitrary lattice point Dn after the luminance/hue adjustment: (ΔRn1, ΔGn1, ΔBn1)

$$\Delta Rn1 = \Delta Rrh \times Ern + \Delta Rgh \times Egn + \Delta Rbh \times Ebn + \Delta Ryh \times Eyn + \Delta Rch \times Ecn + \Delta Rmh \times Emn$$

$$\Delta Gn1 = \Delta Grh \times Ern + \Delta Ggh \times Egn + \Delta Gbh \times Ebn + \Delta Gyh \times Eyn + \Delta Gch \times Ecn + \Delta Gmh \times Emn$$

$$\Delta Bn1 = \Delta Brh \times Ern + \Delta Bgh \times Egn + \Delta Bbh \times Ebn + \Delta Byh \times Eyn + \Delta Bch \times Ecn + \Delta Bmh \times Emn$$

(2) Calculation of coordinates after the luminance/hue adjustment of the lattice point Dn The shift amount calculation unit 1213 calculates the coordinates of the lattice point Dn after the luminance/hue adjustment by the following Equation 6, employing the calculated shift amount (ΔRn1, ΔGn1, ΔBn1) of the arbitrary lattice point Dn.

Coordinates of an arbitrary lattice point before the adjustment: Dn=(Rdn, Gdn, Bdn)

Coordinates of the arbitrary lattice point Dn after the luminance/hue adjustment: (Rdn1, Gdn1, Bdn1)

$$Rdn1 = Rdn + \Delta Rn1$$

$$Gdn1 = Gdn + \Delta Gn1$$

$$Bdn1 = Bdn + \Delta Bn1 \quad \text{(Equation 6)}$$

The shift amount calculation unit 1213 calculates the coordinates of all the lattice points after the luminance/hue adjustment, as the storing targets of the three-dimensional look-up table 131 in the RGB color space, by use of the equation described above. Then, the shift amount calculation unit 1213 supplies, to the saturation adjustment unit 122, the original coordinates and the adjusted coordinates in groups, for the 6-axis vertices and all the lattice points.

It is assumed that the adjustment value of luminance and the adjustment value of hue which are inputted by a user are set adequately in the following ranges.

Luminance=+50-+150%
Hue=−30°-+30°

When the values are set in the present range and the RGB value is expressed by 8 bits, the coordinates of any lattice point after the adjustment also fit in the following ranges.

(Rdn1, Gdn1, Bdn1)<0
(Rdn1, Gdn1, Bdn1)>256

However, in preparation for the case where an adjustment value is set up out of the adjustment range described above, when any of Rdn1, Gdn1, or Bdn1 becomes less than 0 or greater than 256, the shift amount calculation unit 1213 may perform rounding-off (processing for changing a value into a range of not less than 0 and not greater than 256). Accordingly, it becomes possible to obtain a color which can be expressed in the RGB color space. When the rounding-off is performed, there occur some hue changes and a color distortion which is caused by the loss of continuity of the color.

Figure 13:
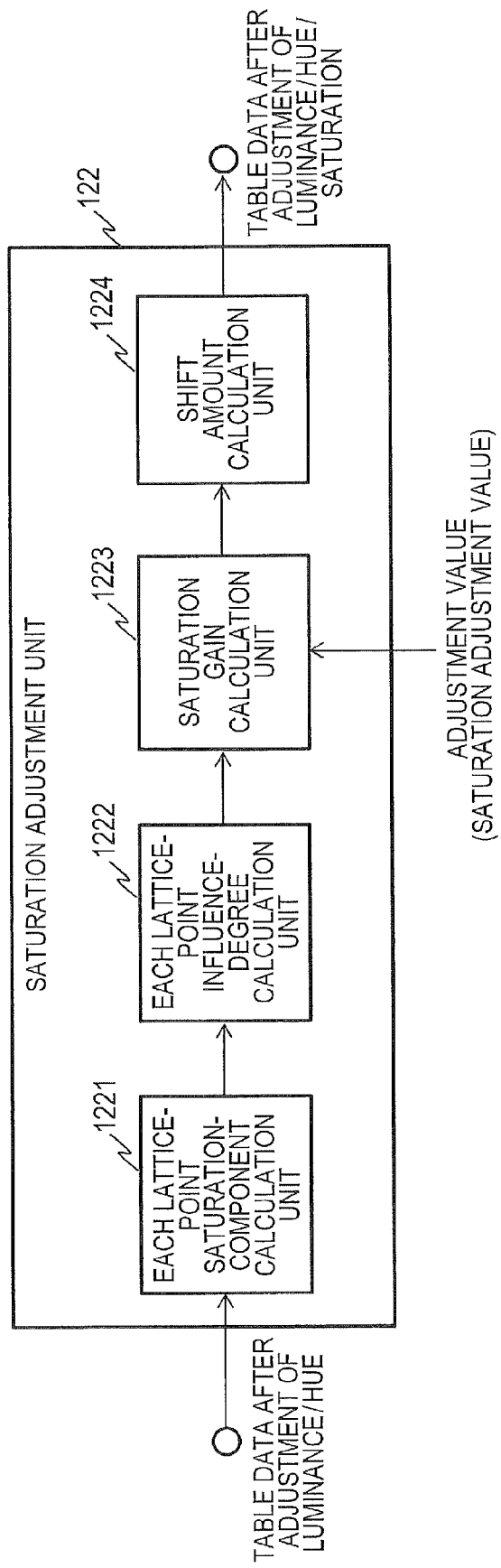
FIG. 13 is a block diagram illustrating a configuration of a saturation adjustment unit 122 according to Embodiment 1.

Next, the saturation adjustment is explained. FIG. 13 is a block diagram illustrating a configuration of the saturation adjustment unit 122. The saturation adjustment unit 122 is configured with an each lattice-point saturation-component calculation unit 1221, an each lattice-point influence-degree calculation unit 1222, a saturation gain calculation unit 1223, and a shift amount calculation unit 1224.

In advance of the explanation of each processing unit in the saturation adjustment unit 122, the adjustment value supplied to the saturation adjustment unit 122 and the definition of the saturation adjustment of the saturation adjustment unit 122 are explained with reference to FIG. 14. As is the case with FIG. 12, FIG. 14 is a drawing illustrating a cube indicating the RGB color space with eight vertices of each of the 6-axis vertices (RGBYCM) and the white and black vertices, and arranging the white vertex at the top and the black vertex at the bottom.

Figure 14:
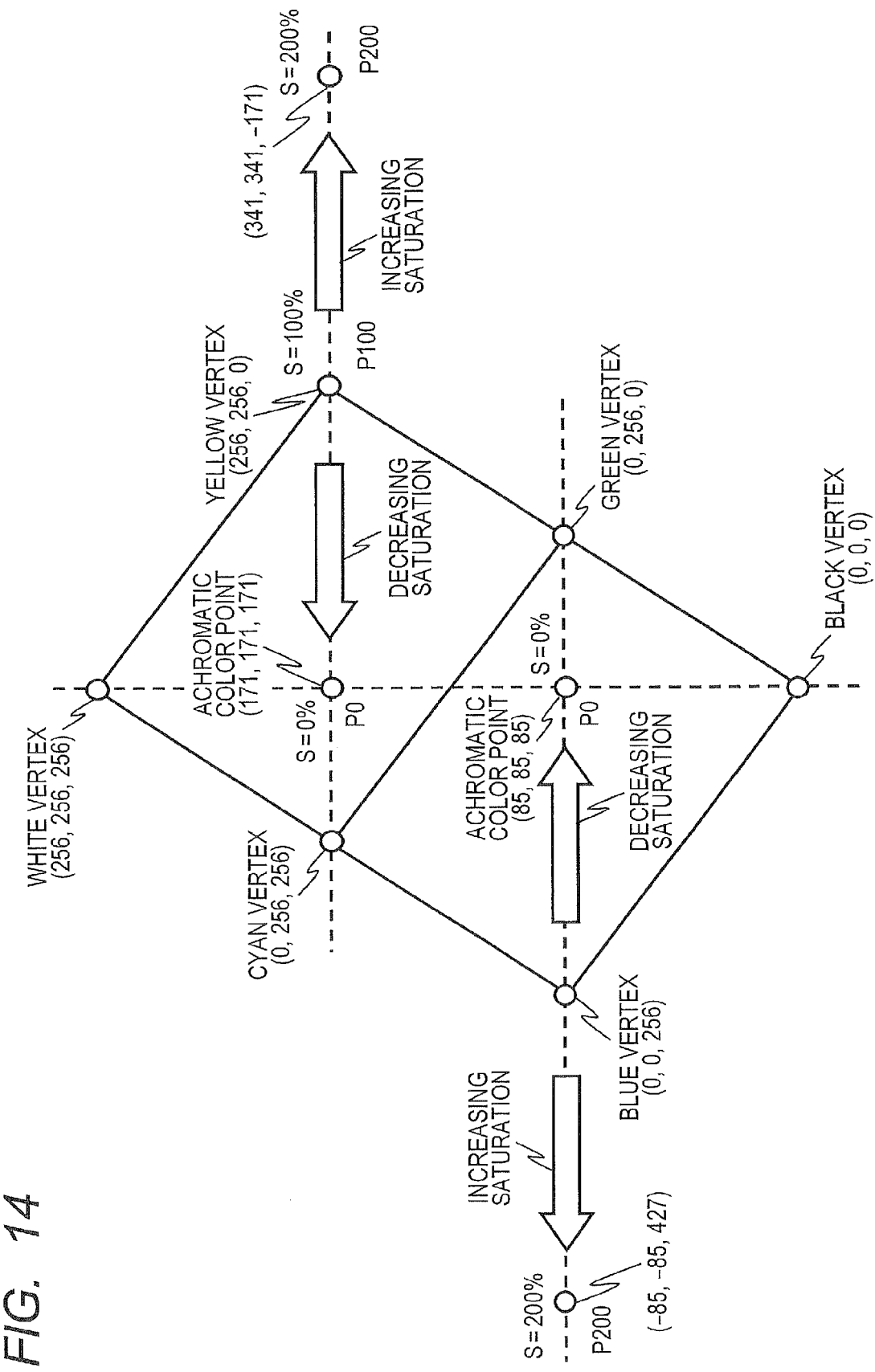
FIG. 14 is a drawing illustrating an adjustment direction of saturation by means of the image processing device 100 according to Embodiment 1.

With reference to FIG. 14, the saturation adjustment of the Y vertex is explained as an example. In cases where the saturation (depth of a color) of the Y axis is adjusted, it is defined in the image processing device 100 according to the present embodiment that when deepening a color (increasing saturation), the color is moved closer to a point P200, and that when thinning a color (decreasing saturation), the color is moved closer to a point P0.

The point P200 and the point P0 are points at which saturation (depth of a color) can be changed without changing the position in the vertical axis direction which indicates luminance. The point P0 is an achromatic color point at which all of the R value, the G value, and the B value become the same as described above, and the closest point to the Y vertex among achromatic colors. The point P0 which is an achromatic color point is defined as a point of saturation=0%. The Y vertex is also described as a point P100 at which saturation=100%, in order to indicate the depth (saturation) of the original color. The point P200 is a point which is shifted as much as the shift amount from the point P100 as the Y vertex to the point P0, in the opposite direction in the RGB color space. That is, the adjustment direction of saturation is a direction which does not affect luminance at all. Specifically, the coordinates of the point P200 are calculated as follows.

Y vertex (saturation=100%): P100 (256, 256, 0)
P0 (saturation=0%): P0 (171, 171, 171)
P200 (saturation=200%): P200
Shift amount between P100 and P0: ΔP0_100

$$\Delta P0\_100 = (171 - 256, 171 - 256, 171 - 0)$$
$$= (-85, -85, 171)$$
$$P200 = P100 - \Delta P0\_100$$
$$= (256 + 85, 256 + 85, 0 - 171)$$
$$= (341, 341, -171)$$

The amount of adjustment is defined such that the state before adjustment (that is, P100) is 100%, the state where the color is shifted to the point P200 is 200%, and the state where the color is shifted to the point P0 is 0%. Here, the coordinate value of the point P200 turns into a negative value (−171) or a value (341) greater than 256, and is in an outside area of the RGB color space. However, since the hue compensation gain selection to be described later is performed, all the lattice points after the saturation adjustment are settled in the area of the RGB color space. (Here, the hue compensation gain selection means processing for selecting an appropriate gain so that the lattice point coordinates after all adjustment may become neither a negative value nor a value exceeding 256 but are settled in the RGB color space without changing hue.) A point P0 and a point P200 are also defined as for others of the each of the 6-axis vertices. The cyan (C) and the magenta (M) are calculated in the same manner as the yellow (Y).

C vertex (saturation=100%): P100 (0, 256, 256)
P0 (saturation=0%): P0 (171, 171, 171)
P200 (saturation=200%): P200
Shift amount between P100 and P0: ΔP0_100

$$\Delta P0\_100 = (171 - 0, 171 - 256, 171 - 256)$$
$$= (171, -85, -85)$$
$$P200 = P100 - \Delta P0\_100$$
$$= (0 - 171, 256 + 85, 256 + 85)$$
$$= (-171, 341, 341)$$

M vertex (saturation=100%): P100 (256, 0, 256)
P0 (saturation=0%): P0 (171, 171, 171)
P200 (saturation=200%): P200
Shift amount between P100 and P0: ΔP0_100

$$\Delta P0\_100 = (171 - 256, 171 - 0, 171 - 256)$$
$$= (-85, 171, -85)$$

$$P200 = P100 - \Delta P0\_100$$
$$= (256 + 85, 0 - 171, 256 + 85)$$
$$= (341, -171, 341)$$

Also as for the red (R), the green (G), and the blue (B), the point P0 as an achromatic color point and the point P200 in the opposite direction are defined as illustrated in FIG. 14. Hereinafter, the definition is provided as for the blue (B) with reference to FIG. 14. Moreover, the definition is also provided as for the red (R) and the green (G) in the same manner as for the blue (B).

B vertex (Saturation=100%): P100 (0, 0, 256)
P0 (saturation=0%): P0 (85, 85, 85)
P200 (saturation=200%): P200
Shift amount between P100 and P0: ΔP0_100

$$\Delta P0\_100 = (85 - 0, 85 - 0, 85 - 256)$$
$$= (85, 85, -171)$$
$$P200 = P100 - \Delta P0\_100$$
$$= (0 - 85, 0 - 85, 256 + 171)$$
$$= (-85, -85, 427)$$

R vertex (saturation=100%): P100 (256, 0, 0)
P0 (saturation=0%): P0 (85, 85, 85)
P200 (saturation=200%): P200
Shift amount between P100 and P0: ΔP0_100

$$\Delta P0\_100 = (85 - 256, 85 - 0, 85 - 0)$$
$$= (-171, 85, 85)$$
$$P200 = P100 - \Delta P0\_100$$
$$= (256 + 171, 0 - 85, 0 - 85)$$
$$= (427, -85, -85)$$

G vertex (saturation=100%): P100 (0, 256, 0)
P0 (saturation=0%): P0 (85, 85, 85)
P200 (saturation=200%): P200
Shift amount between P100 and P0: ΔP0_100

$$\Delta P0\_100 = (85 - 0, 85 - 256, 85 - 0)$$
$$= (85, -171, 85)$$
$$P200 = P100 - \Delta P0\_100$$
$$= (0 - 85, 256 + 171, 0 - 85)$$
$$= (-85, 427, -85)$$

Next, processing of each processing unit of the saturation adjustment unit 122 (FIG. 13) is explained. The table data after the luminance/hue adjustment (that is, the original coordinates and adjusted coordinates of each lattice point and each of the 6-axis vertices) are inputted into the each lattice-point saturation-component calculation unit 1221 from the luminance/hue adjustment unit 121. The each lattice-point saturation-component calculation unit 1221 calculates saturation components of the adjusted coordinates using the following Equation 7.

The coordinates of the arbitrary lattice point Dn after the luminance/hue adjustment: (Rdn1, Gdn1, Bdn1)

The luminance component of the arbitrary lattice point Dn after the luminance/hue adjustment: Adn
The saturation components of the arbitrary lattice point Dn after the luminance/hue adjustment: (Rsn, Gsn, Bsn)

$$Adn = \frac{(Rdn1 + Gdn1 + Bdn1)}{3} \quad \text{(Equation 7)}$$

$$Rsn = Rdn1 - Adn$$
$$Gsn = Gdn1 - Adn$$
$$Bsn = Bdn1 - Adn$$

The each lattice-point saturation-component calculation unit 1221 supplies the table data (that is, the original coordinates and luminance/hue-adjusted coordinates of each lattice point and each of the 6-axis vertices) inputted from the luminance/hue adjustment unit 121, and the saturation components calculated from the adjusted coordinates, to the each lattice-point influence-degree calculation unit 1222.

The each lattice-point influence-degree calculation unit 1222 (corresponding to the saturation influence-degree calculation unit in the claims) calculates the degree of influence of each lattice point in the same manner as the luminance/hue adjustment unit 121. Here, the each lattice point means the coordinates after the adjustment of luminance and hue (the adjusted coordinates).

The each lattice-point influence-degree calculation unit 1222 provides each definition as for the degree of influence exerted on the lattice-point Dn1 after the luminance/hue adjustment due to the shifting of the R vertex, and calculates the degree of influence Ern exerted on the lattice point Dn due to the R axis adjustment by the following processing (1)-(3).
(1) Calculation of the distance Lrn1 between the R vertex and the lattice point Dn1
(2) Limit processing (processing when Lrn1 is larger than the normalized distance Ls)
(3) Calculation of the degree of influence Ern1 exerted on the lattice point Dn1 due to the R axis adjustment.
(1) Calculation of the distance Lrn1 between the R vertex and the lattice point Dn1

R-vertex coordinates after the luminance/hue adjustment: R1=(Rr1, Gr1, Br1)
Arbitrary lattice point coordinates after the luminance/hue adjustment: Dn1=(Rdn1, Gdn1, Bdn1)

$$Lrn1 = \sqrt{(Rdn1-Rr1)^2+(Gdn1-Gr1)^2+(Bdn1-Br1)^2} \quad \text{(Equation 8)}$$

(2) Limit processing (processing when Lrn1 is larger than the normalized distance Ls)
Normalized distance: Ls
Distance between the R vertex and the lattice point Dn1 after limit processing: Lrn1'
If Lrn1≥Ls, then Lrn1'=Ls
If Lrn1<Ls, then Lrn1'=Lrn1

The normalized distance Ls may be set up by recalculating the distance from each of the 6-axis vertices after the luminance/hue adjustment to the nearest adjoining vertex, or the distance to the nearest achromatic color point. When the normalized distance Ls is set up as the distance to the nearest adjoining vertex, it is possible to eliminate the influence on the adjoining axis (color). When the normalized distance Ls is set up as the distance to the nearest achromatic color point, it is possible to prevent the achromatic region from coloring. In this connection, the setting method of the normalized distance Ls is not always restricted to these two kinds, as already described above.

(3) Calculation of the degree of influence Ern1 exerted on the lattice point Dn1 due to the R axis adjustment.

$$Ern1 = \frac{(Ls - Lrn1')}{Ls} \quad \text{(Equation 9)}$$

As described above, the each lattice-point influence-degree calculation unit 1222 calculates the degree of influence Ern1 exerted on the lattice point Dn1 due to the R axis adjustment. The each lattice-point influence-degree calculation unit 1222 calculates similarly the degree of influence exerted on the lattice point Dn1 due to the adjustment of other colors (GB-CYM). The method of calculation is the same as that of the R axis adjustment described above, therefore, only the definition is provided in the following.

The definition about the G vertex is as follows.
(1) Calculation of the distance Lgn1 between the G vertex and the lattice point Dn1
G-vertex coordinates after the luminance/hue adjustment: G1=(Rg1, Gg1, Bg1)
Distance between the G vertex and the lattice point Dn1: Lgn1
(2) Limit processing
Distance between the G vertex and the lattice point Dn1 after limit processing: Lgn1'
If Lgn1≥Ls, then Lgn1'=Ls
If Lgn1<Ls, then Lgn1'=Lgn1
(3) Calculation of the degree of influence Egn1 exerted on the lattice point Dn1 due to the G axis adjustment
The degree of influence due to the G axis adjustment of the lattice point Dn1: Egn1
The definition about the B vertex is as follows.
(1) Calculation of the distance Lbn1 between the B vertex and the lattice point Dn1
B-vertex coordinates after the luminance/hue adjustment: B1=(Rb1, Gb1, Bb1)
Distance between the B vertex and the lattice point Dn1: Lbn1
(2) Limit processing
Distance between the B vertex and the lattice point Dn1 after limit processing: Lbn1'
If Lbn1≥Ls, then Lbn1'=Ls
If Lbn1<Ls, then Lbn1'=Lbn1
(3) Calculation of the degree of influence Ebn1 exerted on the lattice point Dn1 due to the B axis adjustment
The degree of influence exerted on the lattice point Dn1 due to B axis adjustment: Ebn1
The definition about the Y vertex is as follows.
(1) Calculation of the distance Lyn1 between the Y vertex and the lattice point Dn1
Y-vertex coordinates after the luminance/hue adjustment: Y1=(Ry1, Gy1, By1)
Distance between the Y vertex and the lattice point Dn1: Lyn1
(2) Limit processing
Distance between the Y vertex and the lattice point Dn1 after limit processing: Lyn1'
If Lyn1≥Ls, then Lyn1'=Ls
If Lyn1<Ls, then Lyn1'=Lyn1
(3) Calculation of the degree of influence Eyn1 exerted on the lattice point Dn1 due to the Y axis adjustment
The degree of influence exerted on the lattice point Dn1 due to Y axis adjustment: Eyn1

The definition about the C vertex is as follows.
(1) Calculation of the distance Lcn1 between the C vertex and the lattice point Dn1
  C-vertex coordinates after the luminance/hue adjustment:
    C1=(Rc1, Gc1, Bc1)
  Distance between the C vertex and the lattice point Dn1:
    Lcn1
(2) Limit processing
  Distance between the C vertex and the lattice point Dn1 after limit processing: Lcn1'
  If Lcn1≥Ls, then >Lcn1'=Ls
  If Lcn1<Ls, then Lcn1'=Lcn1
(3) Calculation of the degree of influence Ecn1 exerted on the lattice point Dn1 due to the C axis adjustment
  The degree of influence exerted on the lattice point Dn1 due to C axis adjustment: Ecn1

The definition about the M vertex is as follows.
(1) Calculation of the distance Lmn1 between the M vertex and the lattice point Dn1
  M-vertex coordinates after the luminance/hue adjustment:
    M1=(Rm1, Gm1, Bm1)
  Distance between the M vertex and the lattice point Dn1:
    Lmn1
(2) Limit processing
  Distance between the M vertex and the lattice point Dn1 after limit processing: Lmn1'
  If Lmn1≥Ls, then Lmn1'=Ls
  If Lmn1<Ls1, then Lmn1'=Lmn1
(3) Calculation of the degree of influence Emn1 exerted on the lattice point Dn1 due to the M axis adjustment
  The degree of influence exerted on the lattice point Dn1 due to M axis adjustment: Emn1

The each lattice-point influence-degree calculation unit 1222 calculates six kinds of degrees of influence about all the lattice points included in the RGB color space, and supplies the calculated degrees of influence to the saturation gain calculation unit 1223. The each lattice-point influence-degree calculation unit 1222 supplies in addition the data (the table data after the luminance/hue adjustment, and the saturation components calculated from each of the adjusted coordinates) inputted from the each lattice-point saturation-component calculation unit 1221, to the saturation gain calculation unit 1223.

The adjustment value of saturation of each of the 6-axis vertices inputted through the interface unit 200 is supplied to the saturation gain calculation unit 1223. The saturation gain calculation unit 1223 calculates the gain (a value to be multiplied to the saturation components) to the saturation components of each lattice point (Dn1). The saturation gain calculation unit 1223 calculates the gain to the saturation components of each lattice point (Dn1) by processing the following (1)-(4).
(1) Calculation of a basic saturation gain Sgn of each lattice point (Dn1)
(2) Calculation of an over-limit gain (Sgn_Rol, Sgn_Gol, Sgn_Bol)
(3) Calculation of an under-limit gain (Sgn_Rul, Sgn_Gul, Sgn_Bul)
(4) Selection of a saturation gain Sgn_Lim for compensating hue.

(1) Calculation of a basic saturation gain Sgn of each lattice point (Dn1)
The saturation gain calculation unit 1223 calculates a gain serving as the base (basic gain: Sgn) of each lattice point, based on the degree of influence (Ern1, Egn1, Ebn1, Eyn1, Ecn1, Emn1) of each lattice point (Dn1). The saturation gain calculation unit 1223 defines the adjustment value of each of the six axes as follows, and calculates the basic gain (Sgn) using Equation 10.
  R_S: R-axis saturation adjustment value (%)
  G_S: G-axis saturation adjustment value (%)
  B_S: B-axis saturation adjustment value (%)
  Y_S: Y-axis saturation adjustment value (%)
  C_S: C-axis saturation adjustment value (%)
  M_S: M-axis saturation adjustment value (%)

$$Sgn = \left(\frac{R\_S}{100} - 1\right) \times Ern1 + \left(\frac{G\_S}{100} - 1\right) \times Egn1 + \left(\frac{B\_S}{100} - 1\right) \times Ebn1 + \left(\frac{Y_S}{100} - 1\right) \times Eyn1 + \left(\frac{C\_S}{100} - 1\right) \times Ecn1 + \left(\frac{M\_S}{100} - 1\right) \times Emn1$$ (Equation 10)

(2) Calculation of an over-limit gain (Sgn_Rol, Sgn_Gol, Sgn_Bol)
The saturation gain calculation unit 1223 calculates the over-limit gain of each lattice point (Dn1). The over-limit gain is a critical value decided such that if a gain greater than the over-limit gain is multiplied to the saturation components (Rsn, Gsn, Bsn) of each grid, the RGB value after the adjustment exceeds 256. Accordingly, the saturation gain calculation unit 1223 multiplies a gain value to the saturation components (Rsn, Gsn, Bsn) of the coordinates (Dn1=(Rdn1, Gdn1, Bdn1)) of the lattice point after the luminance/hue adjustment, and calculates the gain value with which the sum of the multiplication becomes equal to 256, as the over-limit gain (Sgn_Rol, Sgn_Gol, Sgn_Bol).

(3) Calculation of an under-limit gain (Sgn_Rul, Sgn_Gul, Sgn_Bul)
The saturation gain calculation unit 1223 calculates the under-limit gain of each lattice point (Dn1). The under-limit gain is a critical value decided such that if a gain greater than the under-limit gain is multiplied to the saturation components (Rsn, Gsn, Bsn) of each grid, the RGB value after the adjustment becomes a negative value. Accordingly, the saturation gain calculation unit 1223 multiplies a gain value to the saturation components (Rsn, Gsn, Bsn) of the coordinates (Dn1=(Rdn1, Gdn1, Bdn1)) of the lattice point after the luminance/hue adjustment, and calculates the gain value with which the sum of the multiplication becomes equal to zero (0), as the under-limit gain (Sgn_Rul, Sgn_Gul, Sgn_Bul).

(4) Selection of a saturation gain SgnLim for compensating hue.
If the saturation adjustment is performed using the basic gain (Sgn) as it is, there is a possibility that one of an R value, a G value, and a B value may become greater than 256 or less than 0. That is, there is a possibility that the color after the adjustment turns into a color which cannot be expressed in the RGB color space, and it may become difficult to compensate the hue before the adjustment (there is a possibility that hue may change, compared with one before the adjustment). Accordingly, the saturation gain calculation unit 1223 selects as the final saturation-gain Sgn_Lim, the minimum value of the gain values calculated in (1)-(3) as the saturation gain of each lattice point (Dn1). Thereby, the RGB value after the adjustment is settled in the range of 0-256, and the hue before the adjustment can be compensated.
  Sgn_Lim=Min (Sgn, Sgn_Rol, Sgn_Gol, Sgn_Bol, Sgn_Rul, Sgn_Gul, Sgn_Bul)

The saturation gain calculation unit 1223 supplies the saturation gain Sgn_Lim of each lattice point (Dn1) to the shift amount calculation unit 1224.

The shift amount calculation unit 1224 calculates the RGB coordinates (Rdn2, Gdn2, Bdn2) after the saturation adjustment by calculating the shift amount due to the saturation adjustment of each lattice point (Dn1), and adding the shift amount concerned to the RGB coordinates (Rdn1, Gdn1, Bdn1) after the luminance/hue adjustment. Specifically, the calculation is performed by Equation 11 and Equation 12 in the following. The shift amount calculation unit 1224 also performs analogous calculation for each of the 6-axis vertices (RGBYCM).

Shift amount after the saturation adjustment: ($\Delta Rn2$, $\Delta Gn2$, $\Delta Bn2$)

$$\Delta Rn2 = Rsn \times Sgn\_Lim$$

$$\Delta Gn2 = Gsn \times Sgn\_Lim$$

$$\Delta Bn2 = Bsn \times Sgn\_Lim \quad \text{(Equation 11)}$$

Lattice point coordinates after the saturation adjustment: (Rdn2, Gdn2, Bdn2)

$$Rdn2 = Rdn1 + \Delta Rn2$$

$$Gdn2 = Gdn1 + \Delta Gn2$$

$$Bdn2 = Bdn1 + \Delta Bn2 \quad \text{(Equation 12)}$$

The shift amount calculation unit 1224 inputs into the three-dimensional look-up table 131, the RGB coordinates (Rdn, Gdn, Bdn) before the adjustment and the RGB coordinates (Rdn2, Gdn2, Bdn2) after the adjustment (of luminance, hue, saturation) in pairs, for all the lattice points. Moreover, the shift amount calculation unit 1224 also inputs into the three-dimensional look-up table 131, the RGB coordinates before the adjustment and the RGB coordinates after the adjustment (of luminance, hue, saturation) in pairs, for each of the 6-axis vertices.

By the above, the processing for the adjustment of luminance, hue, and saturation in each of the six axes (RGBCYM) is completed. As described above, the image adjustment unit 130 adjusts and outputs the color of various image data according to the table data stored in the three-dimensional look-up table 131.

Next, the effect of the image processing device 100 according to the present embodiment is explained. As described above, a user inputs only adjustment values of the luminance, hue, and saturation of each of the 6-axis vertices (RGBYCM). The image processing device 100 calculates a color after the adjustment of each color automatically, according to the adjustment values and the position of each lattice point in the RGB color space. Thereby, even in cases where a user does not have any know-how about color management engineering, or does not have any knowledge about the scheme (hardware configuration and software configuration) of the image processing device 100, it is possible to realize the 6-axis color control easily.

Moreover, by adopting a configuration in which a three-dimensional look-up table is employed, it is possible to enjoy many merits, such as a high degree of freedom and reduction of a circuit scale as described above. Furthermore, by adopting a configuration in which an image processing is performed without employing a look-up table, but by utilizing the relation between the original coordinates and the adjusted coordinates in the RGB color space calculated by the above-described technique, it is possible to realize the merit that the 6-axis color control can be practiced even if a user does not have know-how, although there arise some issues such as increase of a circuit scale.

The image processing device 100 performs all the processing in the RGB color space as described above. Therefore, it is possible to avoid issues of color distortions or degradation of utilization efficiency of the color space area, which occur at the time of conversion among different color spaces such as RGB/YCbCr, RGB/HSV, etc. Details are explained with reference to FIG. 15.

Figure 15:
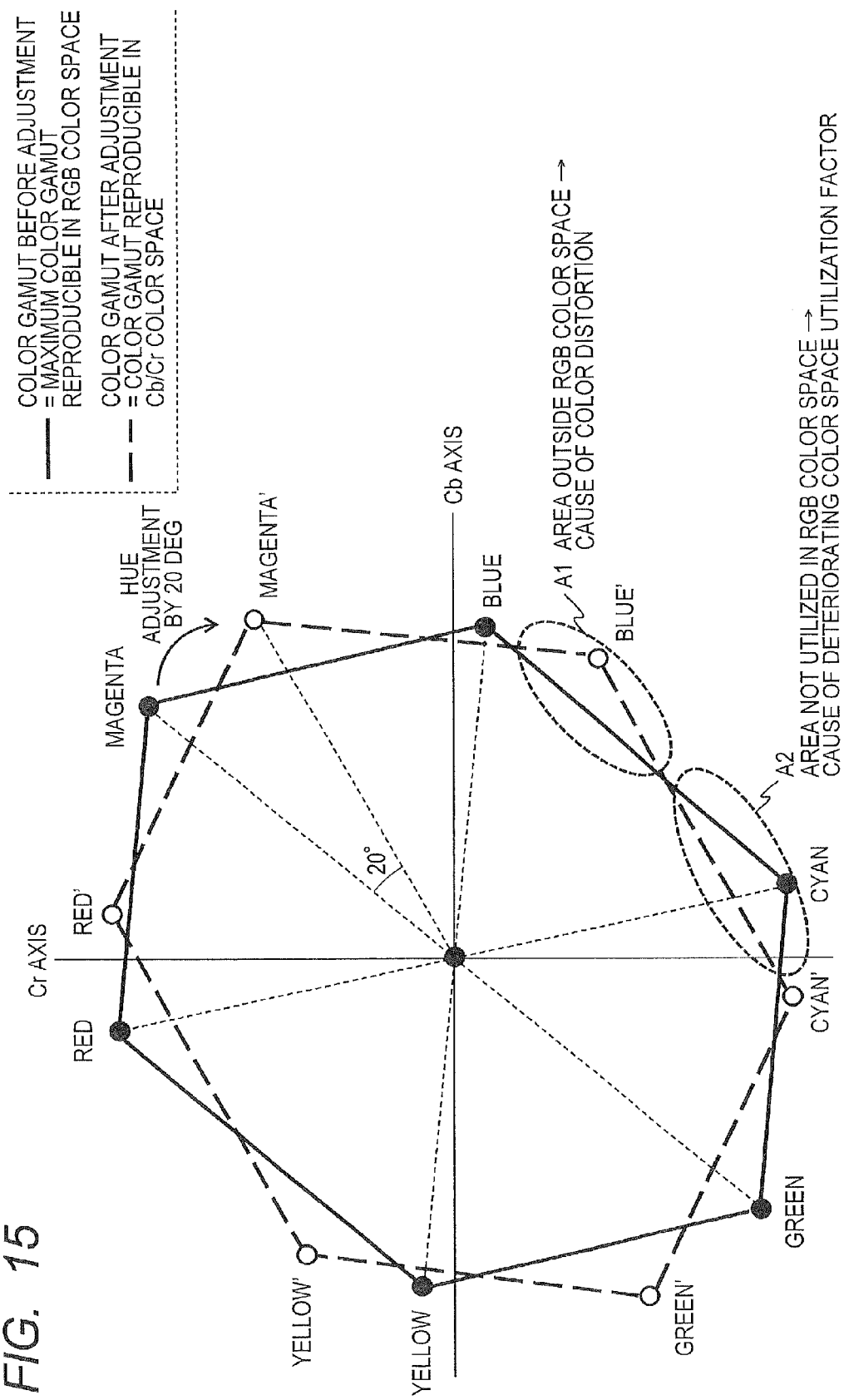
FIG. 15 is a drawing illustrating adjustment concept by use of color-difference signals Cb/Cr.

FIG. 15 illustrates an example of adjusting the entire color gamut in the direction of hue by 20° to the color difference signals Cb/Cr. After the adjustment, an area A1 which has been adjusted to the exterior of the RGB color space is generated, as illustrated in FIG. 15. As measures for the issue, clipping and mapping are performed for restricting the adjusted area to the interior of the RGB color space. Such processing causes an issue of color distortions which impair the continuity of color in the RGB color space. Furthermore, after the adjustment, there arises an area A2 which is not used even if what kind of signal is inputted. Accordingly, it becomes impossible to realize the maximum utilization of the color reproduction range which a display panel, etc. have.

Compared to this, the image processing device 100 according to the present embodiment performs all the processing inside the RGB color space. Since all the processing is performed inside the RGB color space, it is possible to avoid the issue of color distortions or the issue of decrease of the color reproduction range.

Furthermore, the adjustment data generation unit 120 calculates the degree of influence from the distance between each of the 6-axis vertices and each lattice point in the RGB color space, and further calculates automatically the shift amount of each lattice point according to the degree of influence concerned. That is, the lattice point located in a close position to each of the 6-axis vertices is affected strongly by the shifting of each of the 6-axis vertices concerned. Accordingly, it is possible to perform the adjustment of each of the 6-axis vertices (colors) as the user has intended, and at the same time, it is possible to obtain easily an output image which has no color distortion and which is compensated for the continuity of the color space, that is, it is possible to obtain high-quality output images.

As described above, the image processing device 100 manages the area in the RGB color space influenced by each of the 6-axis vertices in terms of the above-described normalized distance Ls. The normalized distance Ls is set according to, for example, the distance from each of the 6-axis vertices to the adjoining vertex or the distance from each of the 6-axis vertices to the nearest achromatic color point. In the former case, it is possible to eliminate the influence on axes (colors) other than the adjustment axis (color) of the six axes, and in the latter case, it is possible to avoid the harmful effect that coloring occurs in the achromatic region. That is, it is possible to realize the independent color adjustment for each of the six axes (colors). As a matter of course, it is also possible for the user to set the normalized distance Ls shorter than the distance described above, depending on the adjustment purpose.

Furthermore, the adjustment data generation unit 120 sets the adjustment direction of luminance and hue in the direction illustrated in FIGS. 4-9. That is, the correction direction of luminance and hue is set in the direction from each of the 6-axis vertices to other vertices. Accordingly, it is possible to realize the adjustment of luminance and hue as the user has intended, and at the same time, it is possible to avoid harmful influence of the adjustment concerned to the other color attributes. That is, when adjusting luminance, the influence on hue and saturation can be eliminated, and when adjusting hue, the influence on luminance and saturation can be eliminated. Thereby the compensated color characteristic becomes very natural, and the adjustment restricted to the interior of the RGB color space is ensured; therefore, it is possible to enhance the color space utilization factor.

The adjustment data generation unit 120 sets the adjustment direction of saturation in the direction illustrated in FIG. 14. Accordingly, it is possible to adjust saturation without affecting luminance. Furthermore, as described above, the change of hue is prevented by calculating the over-limit gain and the under-limit gain in addition to the basic gain and by selecting the minimum value. Accordingly, the compensated color characteristic becomes very natural. Furthermore, in cases where an adjusted color goes out of the RGB color space when the basic gain is employed, the limit gain is employed. The limit gain is a gain which adjusts each color to the boundary of the RGB color space (that is, a point where one of an R value, a G value, and a B value becomes 0 or 256). By employing the limit gain, it is possible to realize the maximum utilization of the RGB color space.

Moreover, when the hue adjustment is performed after the luminance adjustment for each of the 6-axis vertices, it is also possible for the adjustment data generation unit 120 to change the dynamic range of the hue adjustment in consideration of the amount of adjustment of luminance (refer to the point P4 of FIG. 11, and the pertaining explanation). Accordingly, it is possible to realize more precisely the color (color tone) which the user has intended.

In the above, the present invention has been explained based on the embodiment. However, it cannot be overemphasized that the present invention is not restricted to the embodiment, but the present invention may include various modifications, combinations, sub-combinations and alterations which those skilled in the art may devise depending on design requirements and other factors within the scope of the appended claims or the equivalents thereof.

For example, it has been explained that the above-described image processing device 100 performs the 6-axis color control; however, not necessarily restricted to the case, it suffices that the image processing device can perform n-axis color control (n is an integer equal to or greater than three). That is, the image processing device 100 may perform the 3-axis (RGB) adjustment or the 12-axis adjustment by use of the above-described technique. Furthermore, the image processing device 100 may remove a specific color (for example, a magenta (M)) from the adjustment target and may perform 5-axis color control by use of the above-described technique. Similarly, the image processing device 100 may add a color which exists in the middle of the 6-axis vertex colors (RGBYCM) as an adjustment target and may perform 7-axis color control or 8-axis color control, by use of the above-described technique, The above-described explanation has been made for the case where the distances of each side of the RGB color space, that is, an R value, a G value, and a B value, are expressed in 8 bits; however, it is not necessarily restricted to the case, but the above-described explanation can be equally applied to the case where an R value, a G value, and a B value are expressed in an arbitrary number of bits.

As described above, the image processing device 100 needs only to be configured so as to adjust at least one of luminance, hue, and saturation. Moreover, in the configuration illustrated in FIG. 1, the image processing device 100 has adjusted luminance, hue, and saturation, in this order; however, the order of adjustment is not necessarily restricted to the case.

Furthermore, when changing the order of adjustment, as illustrated by the point P4 of FIG. 11, it is desirable to adjust suitably the dynamic range of each of the 6-axis vertices. For example, when calculating the shift amount of each of the 6-axis vertices about luminance after calculating the shift amount of each of the 6-axis vertices about hue, it is preferable that the vertex-luminance shift amount calculation unit 1214 may decrease the dynamic range of each of the 6-axis vertices about luminance as the shift amount of each of the 6-axis vertices about hue becomes large. Accordingly, it is possible to avoid an excessive adjustment of luminance and to realize the color adjustment which a user desires.

Figure 16:
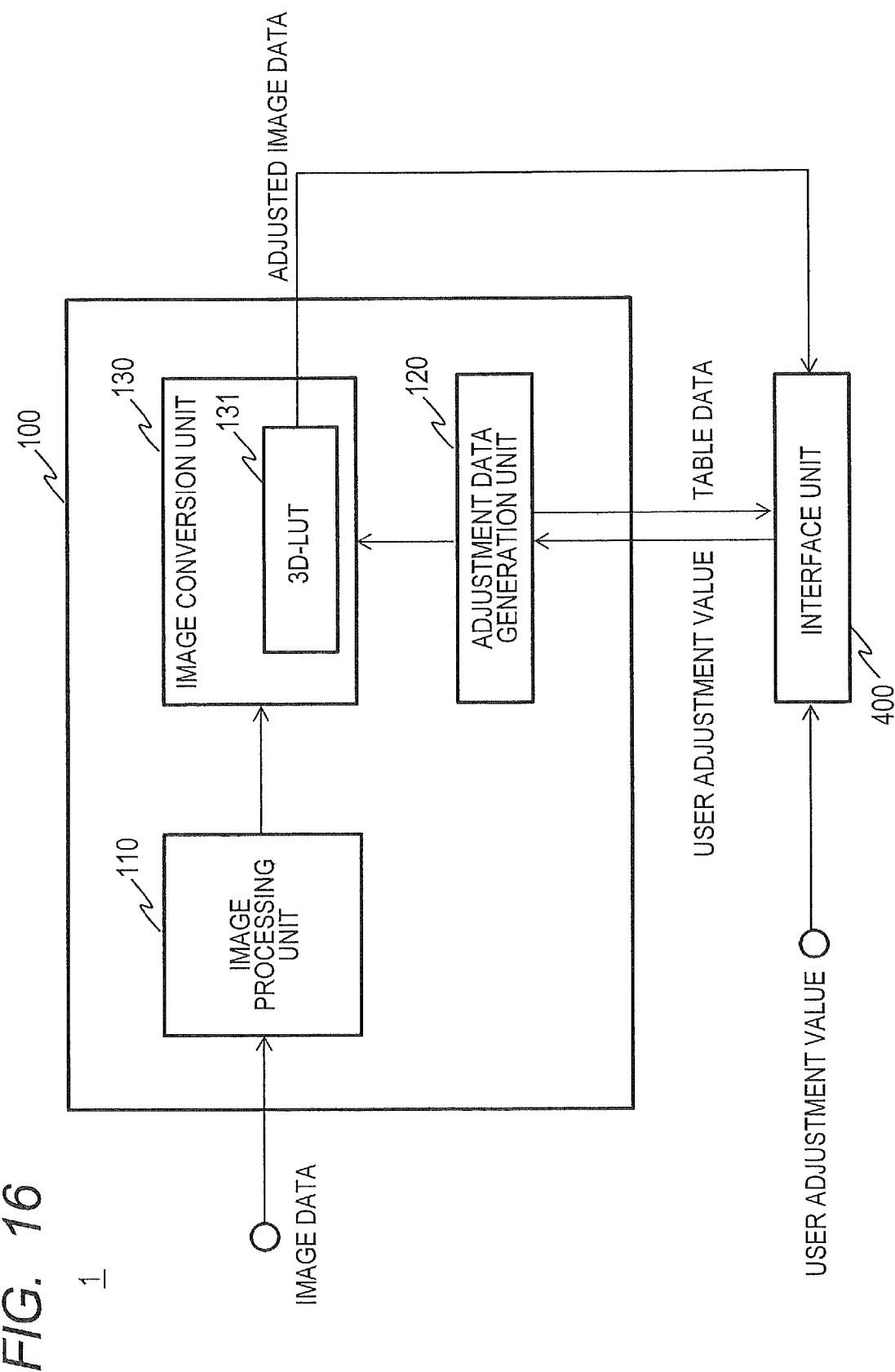
FIG. 16 is a block diagram illustrating a configuration of an image processing system according to Embodiment 1.

The configuration of the image processing system 1 illustrated in FIG. 1 is only an example. The image processing system 1 may be configured with an interface unit 400 in which the input interface unit 200 and the output interface unit 300 are united as illustrated in FIG. 16.

The interface unit 400 provides an input interface which inputs an adjustment value of color attributes (luminance, hue, saturation). Furthermore, the interface unit 400 provides an output interface which displays the data (table data) itself generated by the adjustment data generation unit 120, or the image data of which the color attribute (luminance, hue, saturation) is adjusted with the data concerned. The following explains examples of the interface provided by the interface unit 400.

Figure 17:
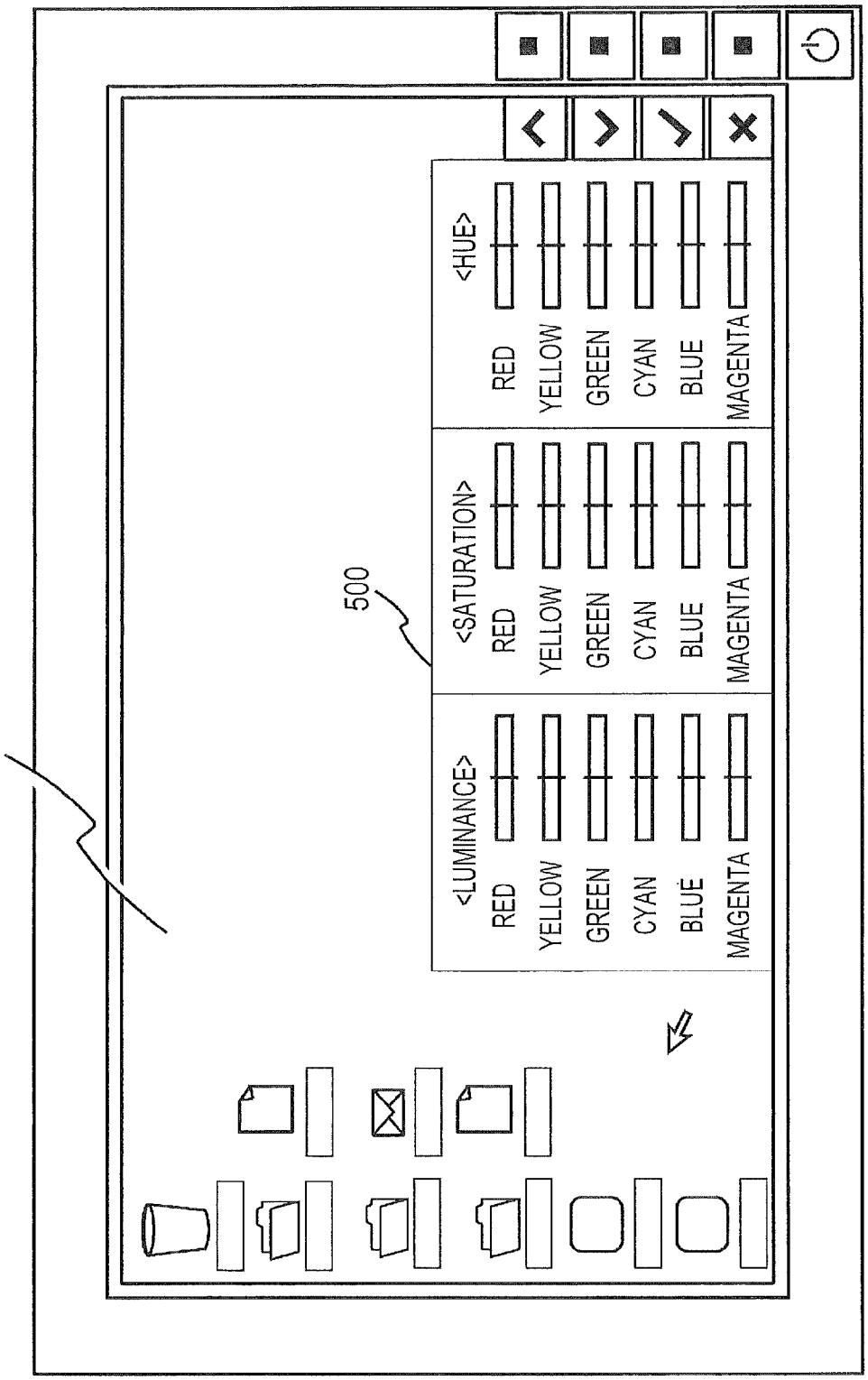
FIG. 17 is a drawing illustrating an example of an input interface provided by an interface unit 400 according to Embodiment 1.

FIG. 17 illustrates an example of an interface screen provided by the interface unit 400. As illustrated in the figure, the interface screen displays an input interface 500 which inputs the adjustment values of luminance, hue, and saturation, and an output interface 510 which displays a display image after the image adjustment is performed using the adjustment values inputted from the input interface 500. The output interface 510 is preferably a display screen of a display device equipped in an ordinary computer. The image processing device 100 generates the table data of the three-dimensional look-up table 131 using the adjustment value inputted from the input interface 500, and adjusts the input image data using the table data concerned. Then, the image processing device 100 provides the image data after the adjustment (in the present case, ordinary display-screen data after the color adjustment) to the interface unit 400. Accordingly, the user can confirm visually each adjustment value to input and also can confirm visually how the color adjustment is performed with the inputted adjustment value.

Figure 18:
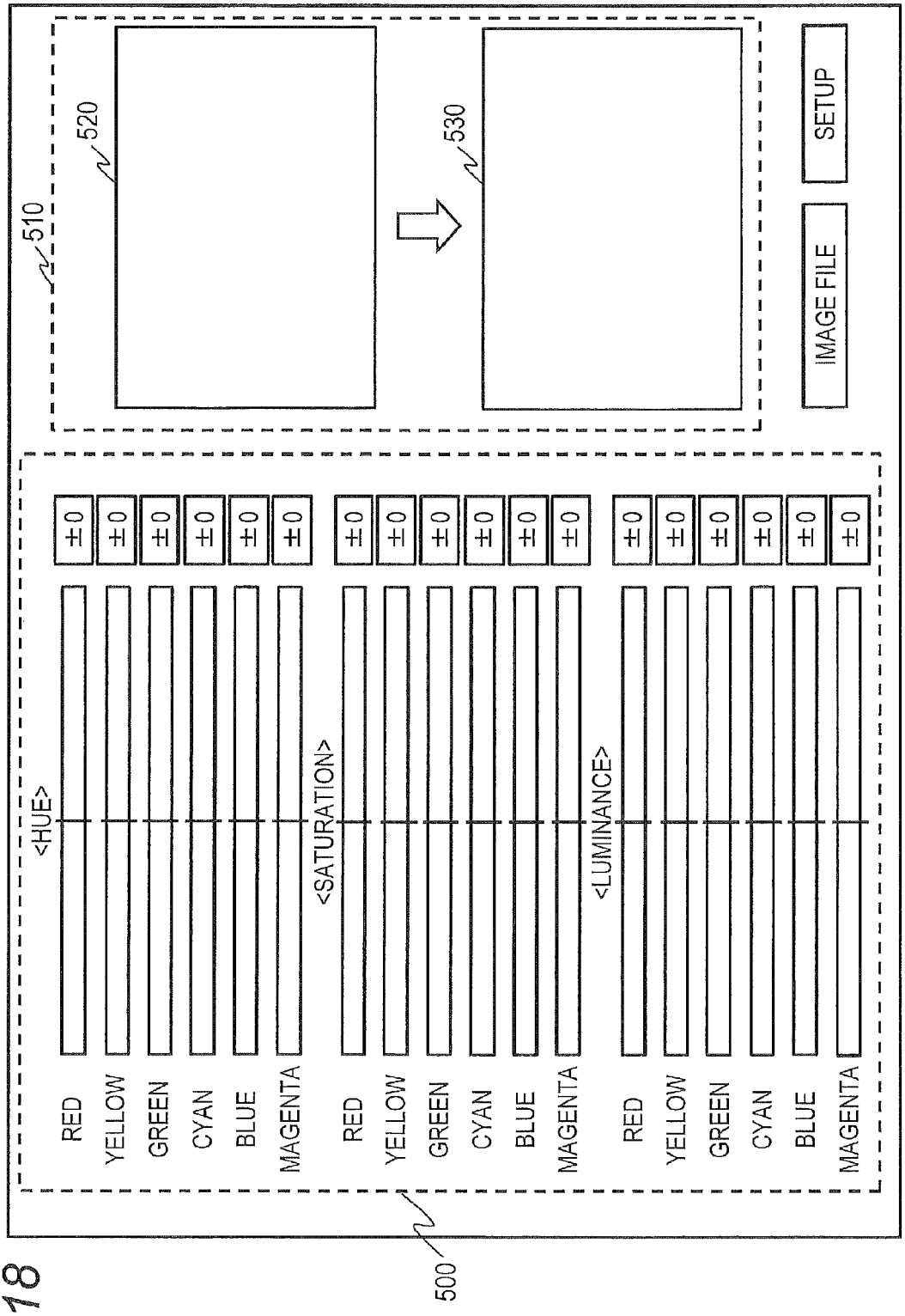
FIG. 18 is a drawing illustrating an example of an input interface provided by the interface unit 400 according to Embodiment 1.

FIG. 18 illustrates a second example of the interface provided by the interface unit 400. As illustrated in the figure, the interface concerned displays an input interface 500 which inputs the adjustment values of luminance, hue, and saturation, and an output interface 510 which displays a display image after the image adjustment is performed using the adjustment value inputted from the input interface 500. The output interface 510 is provided with a display space 520 of the input image data, and a display space 530 of the image data obtained by performing the 6-axis color control to the input image data. The image processing device 100 generates the table data of the three-dimensional look-up table 131 using the adjustment value inputted from the input interface 500, and adjusts the input image data using the table data concerned. Then, the image processing device 100 provides the input image data and the image data after the adjustment to the interface unit 400. By the interface concerned, the user can confirm visually each adjustment value to input and also can confirm visually and concurrently how the image adjustment is performed with the inputted adjustment value.

Figure 19:
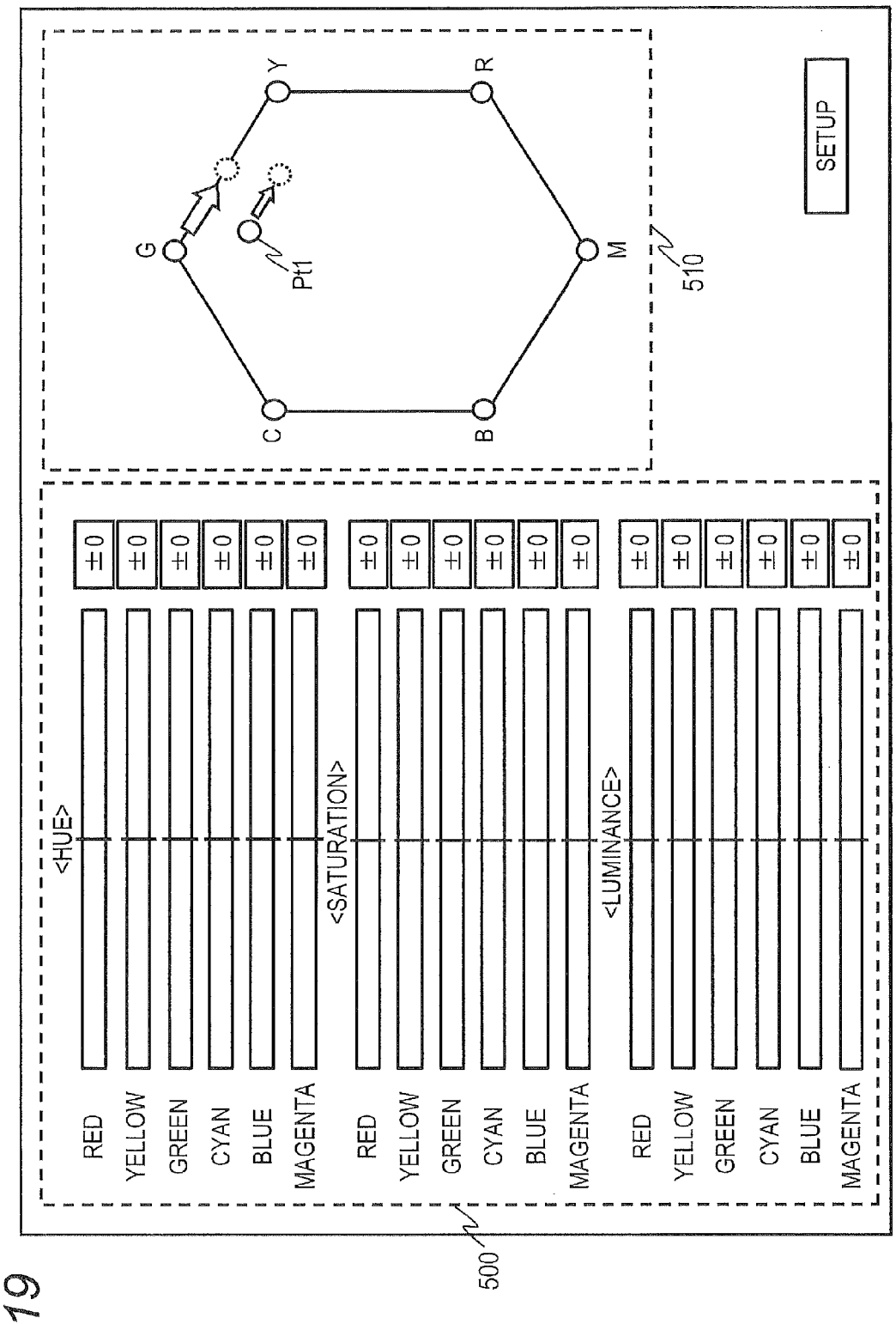
FIG. 19 is a drawing illustrating an example of an input interface provided by the interface unit 400 according to Embodiment 1.

FIG. 19 illustrates a third example of the interface provided by the interface unit 400. As illustrated in the figure, the interface concerned displays an input interface 500 of the adjustment values of luminance, hue, and saturation and an output interface 510 which displays a color after the adjustment of each color. The output interface 510 displays a relation of each of the 6-axis vertices (colors) and the adjusted coordinates. Moreover, the user can select an arbitrary color (Pt1) by an input device such as a mouse. The interface unit 400 notifies the coordinates of the color (Pt1) concerned to the image processing device 100. The image processing device 100 notifies the color coordinates (Pt1') after the adjustment corresponding to the color (Pt1) concerned to the interface unit 400. Then, the interface unit 400 displays the selected color (Pt1) and the color (Pt1') after the adjustment on the output interface 510. Also by the present device, the user can confirm visually each adjustment value to input and also can confirm visually how the image adjustment is performed with the inputted adjustment value. FIG. 19 illustrates an example in which the color space is indicated by the figure of a hexagon; however, it is not necessarily restricted to the example, but the color space may be indicated by the figure of a cube (the figure of a cube corresponding to FIG. 21) with vertices of RGBCYB and black and white.

The interfaces illustrated in FIGS. 17-19 are only examples, and of course, other interfaces may be provided. That is, the output interface 510 needs only to provide the information which allows the visual confirmation of how the 6-axis (n-axis) color control is performed.

The above-described image processing device 100 can realize the high-speed processing which can support also a Hi-Vision image (for example, 1920×1080), by composing the image adjustment unit 130 with hardware (a circuit). It is also possible to realize the processing of the adjustment data generation unit 120 with hardware (a circuit). That is, the image processing device 100 can be realized as a semiconductor device.

The above-described image processing system 1 can be applied as, for example, a display device, a printer, a television receiver, a copying machine, a computer, a digital composite machine (including the so-called MFP (Multifunction Peripheral)), a projector device, a mobile phone terminal, a digital still camera, a smart phone, a digital photograph frame, a handheld game machine, and others. That is, the image processing system 1 can be applied as a device which displays an image on a display unit, a device which can be coupled with a device provided with a display unit, a device which prints or displays an image, and others.

A part or all of the processing that the image processing unit 110, the adjustment data generation unit 120, and the image adjustment unit 130 perform may be preferably realized as a program which operates on an arbitrary computer. The program can be stored in non-transitory computer readable media of various types, and can be provided to a computer. The non-transitory computer readable medium includes tangible storage media of various types. The examples of the non-transitory computer readable medium include a magnetic recording medium (for example, a flexible disk, a magnetic tape, a hard disk drive), an optical magnetic recording medium (for example, a magneto-optic disk), a CD-ROM (Read Only Memory), a CD-R, a CD-R/W, and a semiconductor memory (for example, a mask ROM, a PROM (Programmable ROM), an EPROM (Erasable PROM), a flash ROM, and a RAM (Random Access Memory)). It is also preferable that the program may be provided to a computer by means of transitory computer readable media of various types. The example of the transitory computer readable medium includes an electrical signal, a light signal, and electromagnetic waves. The transitory computer readable medium can provide a program to a computer through the wired communication path of an electric wire, an optical fiber, etc., or through a wireless communication path.

Figure 20:
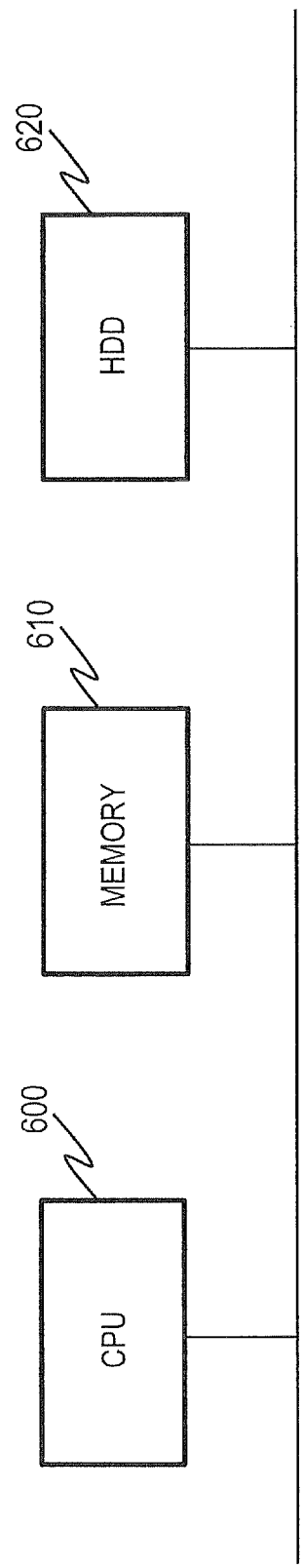
FIG. 20 is a drawing illustrating an example of a hardware configuration of a computer which executes processing of each processing unit of the image processing device 100 by means of a program.

FIG. 20 illustrates an example of the hardware configuration of a computer which performs, as a program, a part or all of the processing that the image processing unit 110, the adjustment data generation unit 120, and the image adjustment unit 130 perform.

The computer concerned includes a CPU (Central Processing Unit) 600 and a memory 610. The CPU 600 and the memory 610 are coupled to a hard disk drive unit (HDD) 620 as an auxiliary memory, through a bus. The storage medium such as the hard disk drive unit 620 can store a computer program which, in cooperation with an operating system, supplies the instruction to the CPU 600, etc. and performs each processing of the image processing device 100 described above.

Lastly, the following explains a technique of determining whether another device performs the color adjustment which is equivalent to what is performed by the image processing device 100 according to the present embodiment. For example, to the another device, a color of each axial vertex (for example, RGBCYM) is inputted (a monochromatic image is inputted, for example), an outputted color is measured by a colorimeter, and the manner in which the color changes is calculated. Moreover, to the another device concerned, an arbitrary color is inputted (a monochromatic image is inputted, for example) and an output color corresponding to the color concerned is measured by the colorimeter. Furthermore, the distance in the RGB color space between the arbitrary color and each of the axial vertex colors is calculated. Based on the relation of the nearness in the RGB color space of the arbitrary color and each of the axial vertex colors, and the manner in which the color changes, it becomes possible to approximately calculate the compensation characteristic of the another device concerned. By comparing this compensation characteristic with the compensation characteristic of the image processing device according to the present embodiment, it is possible to determine whether the another device is performing the color adjustment which is equivalent to what is performed by the image processing device 100 according to the present embodiment. The technique described above is only an example; accordingly, it is natural to be able to employ other technique as well.

What is claimed is:

1. A semiconductor device comprising:
an adjustment data generation unit operable to receive an input of an adjustment value of at least a part of color attributes of each vertex of n axes (n is an integer equal to or greater than 3) serving as adjustment axes in an RGB color space, operable to calculate, for each of the n axes, the degree of influence indicative of a following index of each of the n-axis vertices, on the basis of the distance between each of the n-axis vertices and a target point which is an arbitrary lattice point in the RGB color space, and operable to calculate adjusted coordinates of the target point in the RGB color space, on the basis of the degree of influence and shift of each of the n-axis vertices in the RGB color space according to the adjustment value; and
an image adjustment unit operable to perform color adjustment of inputted image data, on the basis of the original coordinates of the target point and the adjusted coordinates of the target point concerned calculated by the adjustment data generation unit, and on the basis of the original coordinates and adjusted coordinates of each of the n-axis vertices.

2. The semiconductor device according to claim 1,
wherein the adjustment data generation unit comprises:
a luminance/hue adjustment unit operable to calculate adjusted coordinates for which at least one of luminance and hue of the target point is adjusted, and
wherein the luminance/hue adjustment unit comprises:
a vertex-coordinate shift amount calculation unit operable to calculate, for each of the n-axis vertices, a shift amount in a shift direction in which a color attribute as an adjustment target can be adjusted without affecting any other color attributes than the adjustment target, on the basis of the adjustment value related to at least one of luminance and hue of each of the n-axis vertices;
a luminance/hue influence-degree calculation unit operable to calculate the degree of influence on at least one of luminance and hue of the target point, for each of the n axes, on the basis of comparison between the normalized distance serving as the following index of shifting each of the n-axis vertices and the distance from the target point concerned to each of the n-axis vertices; and
a luminance/hue shift amount calculation unit operable to calculate the adjusted coordinates for which at least one of luminance and hue of the target point is adjusted, according to the shift direction of each of the n-axis vertices, the shift amount of each of the n-axis vertices, and the degree of influence for each of the n axes on at least one of luminance and hue of the target point.

3. The semiconductor device according to claim 2,
wherein the vertex-coordinate shift amount calculation unit comprises:
a vertex-luminance shift amount calculation unit operable to calculate the shift amount of each component of RGB of each of the n-axis vertices in a direction in which luminance can be adjusted without affecting hue and saturation, on the basis of the adjustment value related to the luminance of each of the n-axis vertices; and
a vertex-hue shift amount calculation unit operable to calculate the shift amount of each component of RGB of each of the n-axis vertices in a direction in which hue can be adjusted without affecting luminance and saturation, on the basis of the adjustment value related to the hue of each of the n-axis vertices.

4. The semiconductor device according to claim 2,
wherein the normalized distance is determined according to a bit width of RGB values of the RGB color space.

5. The semiconductor device according to claim 2,
wherein the normalized distance is equal to the minimum distance between each of the n-axis vertices and the achromatic color point where all of an R value, a G value, and a B value in the RGB color space are equal.

6. The semiconductor device according to claim 3,
wherein the vertex-hue shift amount calculation unit decreases a distance allowed for each of the n-axis vertices to shift in hue adjustment, as the shift amount of each component of RGB of each of the n-axis vertices calculated by the vertex-luminance shift amount calculation unit increases.

7. The semiconductor device according to claim 3,
wherein the vertex-luminance shift amount calculation unit decreases a distance allowed for each of the n-axis vertices to shift in luminance adjustment, as the shift amount of each component of RGB of each of the n-axis vertices calculated by the vertex-hue shift amount calculation unit increases.

8. The semiconductor device according to claim 2,
wherein the luminance/hue influence-degree calculation unit sets as zero (0) the degree of influence on each of the n-axis vertices of the target point, when the distance from the target point to each of the n-axis vertices is larger than the normalized distance.

9. The semiconductor device according to claim 2,
wherein the luminance/hue shift amount calculation unit performs rounding-off to bring the adjusted coordinates for which at least one of luminance and hue of the target point is adjusted, into the range of the RGB color space.

10. The semiconductor device according to claim 1,
wherein the adjustment data generation unit comprises:
a saturation adjustment unit operable to calculate adjusted coordinates for which saturation of the target point is adjusted, and
wherein the saturation adjustment unit comprises:
a saturation component calculation unit operable to calculate the saturation component of an R value, a G value, and a B value of the target point;
a saturation influence-degree calculation unit operable to calculate the degree of influence on the saturation of the target point for each of the n axes, on the basis of comparison between the normalized distance serving as the following index of shifting each of the n-axis vertices and the distance from the target point to each of the n-axis vertices;
a saturation gain calculation unit operable to calculate a gain value on the basis of the adjustment value related to the saturation of each of the n-axis vertices, the degree of influence for each of the n axes of the target point, and the saturation component of the target point; and
a saturation shift amount calculation unit operable to calculate the adjusted coordinates after the saturation adjustment of the target point, on the basis of the gain value and the saturation component of the target point calculated by the saturation component calculation unit.

11. The semiconductor device according to claim 10,
wherein the saturation adjustment unit defines as an adjustment direction of the saturation the direction of a straight line connecting each of the n-axis vertices and a point nearest to each of the n-axis vertices among the achromatic color points where all of an R value, a G value, and a B value in the RGB color space are equal.

12. The semiconductor device according to claim 11,
wherein the saturation gain calculation unit calculates a basic saturation gain Sgn by accumulating the products of the adjustment value related to the saturation of each of the n-axis vertices and the corresponding degree of influence of each of the n axes,
wherein the saturation gain calculation unit adds to an R value, a G value, and a B value of the target point, the products of the saturation components of the R value, the G value, and the B value of the target point and the corresponding over-limit gains Sgn_Rol, Sgn_Gol, and Sgn_Bol, respectively, and calculates the over-limit gains Sgn_Rol, Sgn_Gol, and Sgn_Bol, so as to make the added values equal to the maximum bit value of the RGB color space, and
wherein the saturation gain calculation unit adds to an R value, a G value, and a B value of the target point, the products of the saturation components of the R value, the G value, and the B value of the target point and the corresponding under-limit gains Sgn_Rul, Sgn_Gul, and Sgn_Bul, respectively, and calculates the under-limit gains Sgn_Rul, Sgn_Gul, and Sgn_Bul, so as to make the added values equal to zero (0), and wherein the saturation gain calculation unit defines the minimum value among the calculated gains (Sgn, Sgn_Rol, Sgn_Gol, Sgn_Bol, Sgn_Rul, Sgn_Gul, Sgn_Bul) as the gain value.

13. The semiconductor device according to claim 1, wherein the image adjustment unit comprises:
a three-dimensional look-up table operable to store the correspondence relation of the original coordinates of the target point and the adjusted coordinates of the target point concerned calculated by the adjustment data generation unit, and the correspondence relation of the original coordinates and the adjusted coordinates of each of the n-axis vertices.

14. The semiconductor device according to claim 1, wherein the number n is 6 and the n-axis vertices are an R vertex, a G vertex, a B vertex, a Y vertex, a C vertex, and an M vertex.

15. An image processing system comprising:
an interface unit operable to provide an input interface for receiving an input of an adjustment value of at least a part of color attributes of each vertex of n axes (n is an integer equal to or greater than 3) serving as adjustment axes in an RGB color space; and
an adjustment data generation unit operable to calculate the degree of influence indicative of a following index of each of the n-axis vertices, for each of the n axes, on the basis of the distance between each of the n-axis vertices and a target point which is an arbitrary lattice point in the RGB color space, and operable to calculate adjusted coordinates of the target point in the RGB color space, on the basis of the degree of influence and shifting of each of the n-axis vertices in the RGB color space according to the adjustment value inputted through the input interface,
wherein the interface unit provides an output interface generated on the basis of the original coordinates of the target point and the adjusted coordinates of the target point concerned calculated by the adjustment data generation unit, and on the basis of the original coordinates and the adjusted coordinates of each of the n-axis vertices.

16. The image processing system according to claim 15, further comprising:
an image adjustment unit operable to generate adjusted image data for which the color adjustment is performed to input image data, on the basis of the original coordinates of the target point and the adjusted coordinates of the target point concerned calculated by the adjustment data generation unit, and on the basis of the original coordinates and the adjusted coordinates of each of the n-axis vertices,
wherein the interface unit displays the adjusted image data on the output interface.

17. The image processing system according to claim 16, wherein the interface unit displays the input image data on the output interface, with the adjusted image data.

18. The image processing system according to claim 15, wherein the interface unit displays a schematic diagram of the RGB color space on the output interface, and
wherein the schematic diagram displays the original coordinates of the target point and the adjusted coordinates of the target point concerned calculated by the adjustment data generation unit, or the original coordinates and the adjusted coordinates of each of the n-axis vertices.

19. A non-transitory computer readable medium comprising a program for causing a computer to execute the processing of:
receiving an input of an adjustment value of at least a part of color attributes of each vertex of n axes (n is an integer equal to or greater than 3) serving as adjustment axes in an RGB color space, and calculating the degree of influence indicative of a following index of each of the n-axis vertices for each of the n axes, on the basis of the distance between each of the n-axis vertices and a target point which is an arbitrary lattice point in the RGB color space; and
calculating the adjusted coordinates of the target point in the RGB color space, on the basis of the degree of influence and shifting of each of the n-axis vertices in the RGB color space according to the adjustment value; and
adjusting color of inputted image data, on the basis of the original coordinates of the target point and the adjusted coordinates of the target point concerned calculated on the basis of the original coordinates and adjusted coordinates of each of the n-axis vertices.

\* \* \* \* \*